(12) United States Patent
Heidel et al.

(10) Patent No.: US 8,728,428 B1
(45) Date of Patent: May 20, 2014

(54) RECOVERING A CAUSTIC SOLUTION VIA CALCIUM CARBONATE CRYSTAL AGGREGATES

(71) Applicant: Carbon Engineering Limited Partnership, Calgary (CA)

(72) Inventors: Kenton Robert Heidel, Calgary (CA); Jane Anne Ritchie, Calgary (CA); Arvinder Pal Singh Kainth, Calgary (CA); David William Keith, Calgary (CA)

(73) Assignee: Carbon Engineering Limited Partnership, Calgary, AB (CA)

( * ) Notice: Subject to any disclaimer, the term of this patent is extended or adjusted under 35 U.S.C. 154(b) by 0 days.

(21) Appl. No.: 13/801,681

(22) Filed: Mar. 13, 2013

(51) Int. Cl.
*C01B 31/20* (2006.01)
(52) U.S. Cl.
USPC .......................................... 423/438; 423/432
(58) Field of Classification Search
USPC .................................. 423/432, 438
See application file for complete search history.

(56) References Cited

U.S. PATENT DOCUMENTS 3,150,926 A * 9/1964 Pope et al. ..................... 423/431
7,097,819 B2 * 8/2006 Konno et al. ................. 423/431

OTHER PUBLICATIONS

Will Cantrell, et al., "Measurement of the Vapor Pressure of Supercooled Water Using Infrared Spectroscopy," J. Atmos. Oceanic Technol., vol. 25, 2008, pp. 1724-1729.
Naceur Jemaa, et al., "Caustic Soda Production from Green Liquor Using the Green Liquor Splitting (GLS) System," retrieved from Internet Mar. 13, 2013, http://www.tappi.org/Downloads/unsorted/UNTITLED—ICR0433pdf.aspx, 10 pages.
Pulping and Bleaching, PSE 476, Lecture 6, Kraft Pulping Chemicals, Power Point, retrieved from Internet, Mar. 13, 2013, https://www.google.ca/url?sa=t&rct=j&q=&esrc=s&source=web&cd=1&ved=OCC4QFjAA&url=http%3A%2F%2Fwww.sefs.washington.edu%2Fclasses.pse.476%2FPowerpoint%2FPowerpoint-Renate%Fpse%02520476-6%2520kraft%2520pulping%2520chemicals.ppt&ei=9UI_UbfsM4qpqwH3-YGIBA&usg=AFQCNF3B57FXzregpEorMkfAxGH5do8NQ&bvm=bv.43287494,d.aWM&cad=rja , 17 pages.

* cited by examiner

*Primary Examiner* — Stuart Hendrickson
(74) *Attorney, Agent, or Firm* — Fish & Richardson P.C.

(57) ABSTRACT

Techniques for converting a portion of a carbonate to hydroxide include receiving an alkaline carbonate solution that includes between 0.1M (moles per liter of solution) to 4.0M hydroxide and between 0.1M to 4.1M carbonate; reacting, in a slaking process, quicklime (CaO) and a low carbonate content fluid to yield a slurry of primarily slaked lime ($Ca(OH)_2$); and reacting the $Ca(OH)_2$ slurry and the alkaline carbonate solution to grow calcium carbonate ($CaCO_3$) crystal aggregates of 0.0005 mm$^3$ to 5 mm$^3$ in volume in a fluidized-bed reactive crystallizer.

20 Claims, 10 Drawing Sheets

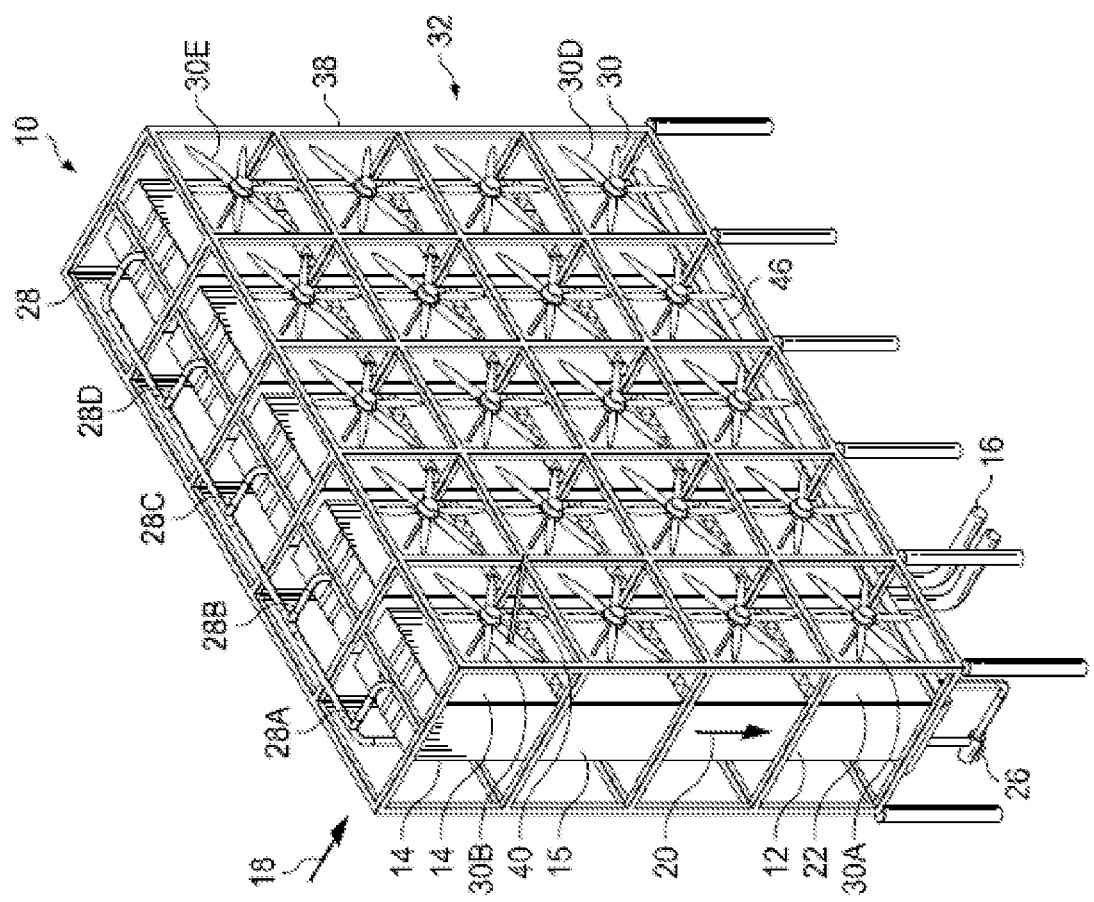

RECOVERING A CAUSTIC SOLUTION VIA CALCIUM CARBONATE CRYSTAL AGGREGATES

TECHNICAL FIELD

The disclosure is related to a method of recovering a caustic solution from a carbonate solution.

BACKGROUND

The industrial Kraft process takes wood and converts it into wood pulp for many uses. In general, the process involves cooking the wood chips in chemicals, mainly comprising a mix of sodium hydroxide and sodium sulfide, known commonly as white liquor in the pulping industry. After the cooking process, the cooked wood is separated from the liquids, the resulting liquid is commonly called black liquor, with varying chemical composition depending upon the type of wood. The black liquor is converted back into white liquor in a process commonly known as a caustic-recovery process, or chemical recovery process.

The first step in the conventional caustic recovery process is concentration of black liquor from the pulping process. Concentrated black liquor is sent to a recovery boiler to (1) recover the key chemical compounds, such as sodium carbonate, sulfides etc.; (2) combust the organics material in the black liquor; and (3) to recover energy which may be used throughout the pulp and paper mill or exported out of the plant. The smelt from the recovery boiler is generally mixed with a solution commonly known as weak liquor from the caustic recovery process, the resulting mixture of the weak liquor and the boiler smelt is commonly referred to as green liquor and generally contains sodium carbonate, sodium hydroxide, sodium hydrosulfide and may contain other compounds such as sodium sulfite, sodium thiosulfate and other process or non-process impurities.

The green liquor and calcium oxide, CaO, solids (commonly known as quicklime or burnt lime) from the downstream calciner are fed into a stirred tank reactor, generally known as slaker or lime-slaker. Two reactions, reaction (1) and reaction (2), take place in the slaker. First CaO reacts with water in the green liquor to form calcium hydroxide ($Ca(OH)_2$, commonly known as slaked lime, hydrated lime, builders' lime, pickling lime, or Chuna) via reaction (1).

$$CaO_{(s)} + H_2O_{(aq)} \rightarrow Ca(OH)_{2(s)} \quad (1)$$

As soon as any calcium hydroxide $Ca(OH)_2$ is formed it begins reacting with sodium carbonate in the green liquor to form solid calcium carbonate ($CaCO_3$), via reaction (2).

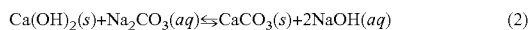
$$Ca(OH)_2(s) + Na_2CO_3(aq) \leftrightarrows CaCO_3(s) + 2NaOH(aq) \quad (2)$$

Reaction (1) and Reaction (2) are generally known as the slaking reaction and the causticization reaction, respectively; and both reactions occur simultaneously anytime water containing carbonate is mixed with quicklime.

The bulk of the causticization reaction takes place in the slaker. Generally, the contents from the slaker are fed into a series of stirred tanks, typically referred to as causticizers, where the reactions are allowed to proceed to near completion. The resulting solution is referred to as unclarified white liquor and contains, among other chemicals, suspended $CaCO_3$ particles, called lime mud which are around 15 μm in size.

Thereafter, generally the lime mud is first removed from the white liquor via clarifying tanks or pressurized filters. Typical filtration equipment for this step includes pressurized tubular filters or pressurized disc filters. The resulting clarified white liquor is returned to the pulping process to cook more wood chips, and the lime mud is sent for further washing and filtration before being calcined. Calcination is the term for converting lime mud ($CaCO_3$) into quicklime (CaO):

$$CaCO_3(s) \rightarrow CaO(s) + CO_2(g) \quad (3)$$

The resulting off-gas is typically cleaned and discharged to atmosphere while the produced CaO is sent back to the slaker for reaction with the green liquor.

The lime mud in the conventional caustic recovery process fouls both the calciner and any downstream gas processing equipment. Rotary kilns have been shown to tolerate the fouling caused by the lime mud and operate continuously requiring only minor shutdowns for cleaning and maintenance. As a result, the rotary kiln is the most common type of calciner applied today to calcine lime mud and the hot off-gases from the kiln are commonly used to dry incoming lime mud as they will foul any other type of equipment. The rotary kiln is a large, expensive, difficult to operate piece of equipment and the off-gases are vented to the atmosphere still containing a large quantity of high grade heat resulting in an overall thermal efficiency of around 40%. Many of the challenges in the calcination section of the conventional caustic recovery process are a direct result of the fine particle size of lime mud and its tendency to foul high temperature solids processing equipment.

SUMMARY

In one general implementation, a method for converting a portion of a carbonate to hydroxide includes receiving an alkaline carbonate solution that includes between 0.1M (moles per liter of solution) to 4.0M hydroxide and between 0.1M to 4.1M carbonate; reacting, in a slaking process, quicklime (CaO) and a low carbonate content fluid to yield a slurry of primarily slaked lime ($Ca(OH)_2$); and reacting the $Ca(OH)_2$ slurry and the alkaline carbonate solution to grow calcium carbonate ($CaCO_3$) crystal aggregates of 0.0005 $mm^3$ to 5 $mm^3$ in volume in a fluidized-bed reactive crystallizer.

A first aspect combinable with the general implementation further includes conditioning the $CaCO_3$ crystal aggregates; and calcining the conditioned $CaCO_3$ crystal aggregates to yield CaO and carbon dioxide ($CO_2$).

In a second aspect combinable with any of the previous aspects, conditioning the $CaCO_3$ crystal aggregates includes washing the $CaCO_3$ crystal aggregates; and drying the washed $CaCO_3$ crystal aggregates.

A third aspect combinable with any of the previous aspects further includes partially removing, through the washing, compounds containing one or more of alkali metals, sulphur, silicon, iron, copper, magnesium, boron, chromium, antimony, cadmium, molybdenum, vanadium, zinc or phosphorous.

In a fourth aspect combinable with any of the previous aspects, drying the washed $CaCO_3$ crystal aggregates includes capturing heat from a heat source; and supplying the captured heat to dry the washed $CaCO_3$ crystal aggregates at a temperature between 20° C. and 500° C.

In a fifth aspect combinable with any of the previous aspects, the heat sources includes least one of a water vapour recompression process or the calcining of the conditioned $CaCO_3$ crystal aggregates.

In a sixth aspect combinable with any of the previous aspects, calcining the conditioned $CaCO_3$ crystal aggregates includes calcining the conditioned $CaCO_3$ crystal aggregates in one or more of a rotary kiln, bubbling fluidized beds, circulating fluidized beds, a flash calciner, or a shaft kiln.

In a seventh aspect combinable with any of the previous aspects, calcining the conditioned $CaCO_3$ crystal aggregates includes calcining the $CaCO_3$ crystal aggregates in equipment that are sensitive to compounds containing one or more of alkali metals, sulphur, copper, magnesium, boron, chromium, antimony, cadmium, molybdenum, vanadium, zinc, phosphorous, iron, or silicon.

In an eighth aspect combinable with any of the previous aspects, calcining the conditioned $CaCO_3$ crystal aggregates includes calcining the conditioned $CaCO_3$ crystal aggregates at a gauge pressure from between 100 Pa and 1000 kPa.

A ninth aspect combinable with any of the previous aspects further includes capturing the off-gas from the calcining; cleaning the captured off-gas; and compressing the cleaned off-gas.

A tenth aspect combinable with any of the previous aspects further includes removing at least a portion of the produced heat for an industrial process.

In an eleventh aspect combinable with any of the previous aspects, calcining the conditioned $CaCO_3$ crystal aggregates to yield CaO and $CO_2$ includes calcining the conditioned $CaCO_3$ crystal aggregates to yield CaO, $CO_2$, and heat in a solid product or off-gas.

A twelfth aspect combinable with any of the previous aspects further includes producing electricity from the heat; using the heat to raise the temperature of material before it enters the calciner; using the heat to dry $CaCO_3$ crystal aggregates; and delivering the heat to other equipment employed in this method or other industrial processes.

In a thirteenth aspect combinable with any of the previous aspects, the $Ca(OH)_2$ slurry includes $Ca(OH)_2$ and water with a concentration of solids in a range of between 2 wt % and 5 wt %; between 5 wt % and 10 wt %; between 10 wt % and 40 wt %; or between 40 wt % and 100 wt %.

In a fourteenth aspect combinable with any of the previous aspects, the low carbonate content fluid includes water, and an amount of carbonate in the water includes less than 0.1 moles of carbonate for every 1 mole of CaO delivered to the slaking process.

In a fifteenth aspect combinable with any of the previous aspects, the majority of $CaCO_3$ crystal aggregates are an equivalent volume as spheres in the size range of between 0.1 mm to 2 mm in size or diameter (between a volume of 0.0005 $mm^3$ to 5 $mm^3$); between 0.5 mm and 1.5 mm in size or diameter (between a volume of 0.06 $mm^3$ to 1.8 $mm^3$); or between 0.8 mm and 1.2 mm in size or diameter (between a volume of 0.2 $mm^3$ to 0.9 $mm^3$).

A sixteenth aspect combinable with any of the previous aspects further includes supplying heat to the calcination by combusting a hydrocarbon with oxygen which is substantially free of nitrogen, in that it contains less than 10 mole % nitrogen, from an air separation unit (ASU); and producing a second stream which is depleted in oxygen with respect to air and contains less than 0.1 mole % water vapour, from the ASU.

In a seventeenth aspect combinable with any of the previous aspects, conditioning the washed $CaCO_3$ crystal aggregates includes drying the washed $CaCO_3$ crystal aggregates with the second stream which is substantially free of oxygen and water from the ASU.

An eighteenth aspect combinable with any of the previous aspects further includes mixing a second amount of oxygen supplied by the ASU with gases from the calcination of the conditioned $CaCO_3$ crystal aggregates.

A nineteenth aspect combinable with any of the previous aspects further includes combusting the mixture of oxygen and gases in a boiler to produce steam and supplying the steam to the dryer, another industrial process, or a steam turbine to produce electrical power.

In a twentieth aspect combinable with any of the previous aspects, the alkaline carbonate solution includes a green liquor from a pulping plant.

A twenty-first aspect combinable with any of the previous aspects further includes providing a basic solution formed from reacting the $Ca(OH)_2$ slurry and the alkaline carbonate solution to the pulping plant as clarified white liquor.

A twenty-second aspect combinable with any of the previous aspects further includes feeding the captured $CO_2$ to a LignoBoost™ process.

A twenty-third aspect combinable with any of the previous aspects further includes capturing a basic solution formed from reacting the $Ca(OH)_2$ slurry and the alkaline carbonate solution; providing the captured basic solution to a gas absorber that captures atmospheric $CO_2$; and receiving, from the gas absorber, the alkaline carbonate solution.

A twenty-fourth aspect combinable with any of the previous aspects further includes capturing a basic solution formed from reacting the $Ca(OH)_2$ slurry and the alkaline carbonate solution; providing the captured basic solution to an gas absorber that captures $CO_2$ from an industrial process; and receiving, from the gas absorber, the alkaline carbonate solution.

In a twenty-fifth aspect combinable with any of the previous aspects, the industrial process includes at least one of a power plant, a cement plant, a refinery, a foundry, a smelter, iron plants, steel plants, aluminum plants or an incinerator.

In a twenty-sixth aspect combinable with any of the previous aspects, the low carbonate content fluid includes at least one of steam or liquid water.

In a twenty-seventh aspect combinable with any of the previous aspects, reacting, in a slaking process, CaO and a low carbonate content fluid includes reacting, in a slaking process, CaO and a low carbonate content liquid at a condition that includes a temperature between 100° C. and 200° C. and a pressure such that the equilibrium state of water is liquid.

A twenty-eighth aspect combinable with any of the previous aspects further includes capturing heat produced from the slaking process; and using the heat to perform at least one of: generating steam, transferring the heat to a process stream, or generating power.

A twenty-ninth aspect combinable with any of the previous aspects further includes growing the $CaCO_3$ crystal aggregates on a seed material.

A thirtieth aspect combinable with any of the previous aspects further includes processing at least a portion of the $CaCO_3$ crystal aggregates to produce the seed material.

In a thirty-first aspect combinable with any of the previous aspects, processing the $CaCO_3$ crystal aggregates includes crushing the $CaCO_3$ crystal aggregates.

In another general implementation, an apparatus for converting a portion of carbonate to hydroxide in a solution including between 0.1M to 4.0M hydroxide and between 0.1M to 4.1M carbonate includes a slaker configured to react quicklime (CaO) and a low carbonate content fluid to yield a slurry of primarily slaked lime ($Ca(OH)_2$); and a fluidized-bed reactive crystallizer in fluid communication with the slaker and configured to react the $Ca(OH)_2$ with an alkaline carbonate solution and grow calcium carbonate ($CaCO_3$) crystal aggregates of between 0.0005 $mm^3$ to 5 $mm^3$ volume.

In a first aspect combinable with the general implementation, the fluidized-bed reactive crystallizer includes a discharge output for a basic solution slurry that includes the $CaCO_3$ crystal aggregates.

A second aspect combinable with any of the previous aspects further includes a solid-liquid separator in fluid communication with the discharge output and configured to receive the basic solution slurry and separate the $CaCO_3$ crystal aggregates from the basic solution; a washer in material communication with the separator and configured to receive and wash the $CaCO_3$ crystal aggregates; a dryer in fluid communication with the washer and configured to evaporate a liquid from the $CaCO_3$ crystal aggregates; and a calciner in fluid communication with the dryer and configured to convert the $CaCO_3$ crystal aggregates to CaO and carbon dioxide ($CO_2$).

In a third aspect combinable with any of the previous aspects, the calciner includes at least one of a rotary kiln, bubbling fluidized beds, circulating fluidized beds, a flash calciner, or a shaft kiln.

In a fourth aspect combinable with any of the previous aspects, the calciner is configured to hold a pressure of between 100 Pa and 1000 kPa gauge.

In a fifth aspect combinable with any of the previous aspects, an ASU is in communication with the calciner and configured to deliver oxygen which is substantially free of nitrogen.

In a sixth aspect combinable with any of the previous aspects, the ASU is in communication with the dryer and configured to deliver a gas, which is substantially free of water, to the dryer.

In a seventh aspect combinable with any of the previous aspects, the solid-liquid separator includes at least one of a classifier, a screen, a pressure filter, a vacuum filter, a filter press, a settling tank, a centrifuge, or a hydrocyclone.

An eighth aspect combinable with any of the previous aspects further includes a $CO_2$ output configured to fluidly communicate with at least one of a pulping plant, a LignoBoost™ process, a $CO_2$ reservoir, an EOR field, a $CO_2$ pipeline, algal culture, greenhouses or an industrial consumer of $CO_2$.

A ninth aspect combinable with any of the previous aspects further includes an input configured to fluidly communicate with a gas absorber to receive $CO_2$ from an industrial source of $CO_2$.

In a tenth aspect combinable with any of the previous aspects, the industrial source includes at least one of a power plant, a cement plant, a refinery, a foundry, a smelter, iron plants, steel plants, aluminum plants or an incinerator.

An eleventh aspect combinable with any of the previous aspects further includes an output configured to materially communicate the $CaCO_3$ crystal aggregates with a grinding-sieving unit; and an input configured to materially communicate between the fluidized-bed reactive crystallizer and the grinding-sieving unit to receive a seed material from the grinding-receiving unit.

A twelfth aspect combinable with any of the previous aspects further includes an input configured to fluidly communicate with a gas absorber to receive $CO_2$ from atmospheric air.

A thirteenth aspect combinable with any of the previous aspects further includes an input configured to fluidly communicate with pulp plant to receive green liquor and an output configured to fluidly communicate with a pulp plant to deliver clarified white liquor.

Various implementations described in the present disclosure may include none, one, some, or all of the following features. For example, a low carbonate solution content and volume of calcium carbonate crystal aggregates generated and used in the calcination process and downstream equipment may enable the use of a wide range of energy efficient calcination equipment such as oxy-fired fluid bed calciners and economic washing equipment such as vibrating screens. Further, production of a more reactive CaO product stream may be enabled.

In some aspects, the physical properties such as hardness and porosity, as well as the morphological properties such as size (often described in terms of volume) and shape of the calcium carbonate crystal aggregates created in the disclosed processes may enable several advantages throughout the process. For example, the low porosity and larger size of the calcium carbonate crystal aggregates provides for ease of solution removal during the separation and washing operations, in comparison to material that is more porous and/or smaller in size. The hardness of the calcium carbonate crystal aggregates may reduce some of the challenges associated with calcination, because a harder particle may be more resistant to fracture and attrition, which are caused by solids transfer equipment such as conveyors and by fluidized bed systems. Fracture and attrition may lead to a reduction in the average particle size of the material and may lead to the creation of a portion of the material with a particle size less than the starting material. Large particle size and/or the spheroid shape of the crystal aggregates may allow for higher gas velocities in the calciner and, therefore, higher capacities than material that is smaller in size and/or less spherical in shape.

In some example aspects, the disclosed processes may enable the use of fluidized bed calciners, which may be designed with thermal efficiencies over 80% but are sensitive to fouling and cannot process solids such as lime mud. In some aspects, the ease of removing solution from the calcium carbonate crystal aggregates enables delivery of a material stream with over 85% solids by weight to the calciner, thereby introducing less undesired dissolved chemicals into the calciner. Some of these undesired chemicals, such as alkali, may melt at the operating temperature of the calciner. Both these molten chemicals and feed material with a small particle size may lead to fouling of the calciner, solids handling equipment, and gas handling equipment. The disclosed processes may produce calcium carbonate crystal aggregates that reduce an amount of fouling which occurs in the calcination equipment and thus enable the use of thermally efficient calciners in the calcination process.

In some aspects, one or more of the disclosed processes or apparatus may enable the production of power from the heat contained within the solids and/or gases leaving the calciner. For example, due to the physical properties (e.g., hardness, low porosity) and morphology (e.g., shape, size, volume, texture) of the crystal aggregates, the calcination of the calcium carbonate crystal aggregates is less likely to produce dust and airborne chemicals which can then be entrained in the hot off-gases leaving the calcination equipment. In systems handling finer particles such as lime mud, the resulting hot off-gases may not be able to be sent to other heat exchange equipment such as an auxiliary boiler (which could be used to generate steam for turbines to produce electricity), as the inherent dust and chemical entrainment in the off-gases would lead to fouling of the heat exchange surface, possibly rendering it inoperable. With the production of the calcium carbonate crystal aggregates one or more of the disclosed processes or apparatus, the presence of dust and chemicals in the hot off-gases from the calciner is less likely and therefore the heat in the off-gases can be considered for the production of steam, and in turn electricity, for use within the process (or other processes). For example, hot off-gases from the calciner may be sent to an auxiliary boiler where they are mixed with fuel and oxygen sources to combust and provide heat to produce high grade steam, which can then be used in a turbine to generate electricity.

In some aspects, one or more of the disclosed processes or apparatus may enable oxy-firing, which is more cost effective than gas scrubbing for $CO_2$ with equipment such as an amine unit, to reduce $CO_2$ emissions of a pulp plant. For example, since the produced calcium carbonate crystal aggregates of the disclosed processes may enable the use of calciners other than the rotary kiln, calciners that can be oxy-fired (e.g., due to better leak rates than rotary kilns) can be used without concern of air leaking into the vessel and diluting the gases with nitrogen. When capture of $CO_2$ is desired, oxy-firing a calciner may be more cost effective than air-firing the same calciner and then using a gas scrubbing system such as an amine unit to capture the $CO_2$ in the off-gases. In some cases, producing 2 moles of oxygen with an Air Separation Unit (ASU) to combust a mole of fuel costs approximately the same as capturing the produced mole of $CO_2$ with a post combustion capture unit, such as an amine unit. The complete combustion of methane gas is shown below to aid in exemplifying this concept:

$$CH_4(g)+2O_2(g) \rightarrow CO_2(g)+2H_2O(g) \qquad (4)$$

$ for ASU to produce 2 moles of $O_2$=$ for Amine to capture 1 mole $CO_2$

Around one third of the total $CO_2$ leaving the calciner is from the combustion of fuel with the rest being from the calcination of $CaCO_3$ via the reaction (3), making the complete series of reactions in the oxy-fired calciner:

$$2CaCO_3(s)+CH_4(g)+2O_2(g) \rightarrow 2CaO(s)+3CO_2(g)+ \\ 2H_2O(g) \qquad (5)$$

Therefore, an ASU may need only produce the 2 moles of oxygen to combust the fuel while an amine unit would need to capture 3 moles of $CO_2$. In some aspects, this may produce a roughly 67% reduction in the cost of capturing $CO_2$ from this process as compared to use of an amine unit. In some aspects, such a process can be applied to existing pulp and paper plants as well as to new and upcoming processes such as $CO_2$ capture from atmospheric air.

In some aspects, one or more of the disclosed processes or apparatus may enable calciners with a lower capital cost/unit capacity than traditional systems. For example, since the use of calcium carbonate crystal aggregates enables the use of calcination equipment such as fluidized bed calciners, which can be fed a gaseous stream with very high oxygen concentrations or even pure oxygen, the disclosed processes may increase the processing capacity per unit, which in turn may reduce the cost of the calcination equipment. Calciner capacities are related to the amount of oxygen they can process per second. They are normally run on air which contains about 21% oxygen, but if they are fed a stream of pure oxygen the capacity will increase by about a factor of 5 since calciner capacity is almost linearly related to oxygen processing rate and a given size of calciner can process a given volume of gas. Most calciners, such as rotary kilns, may not be able to run on pure oxygen because they may not have intense enough mixing of solids and gases and the flame temperature in a pure oxygen environment results in hot spots which will destroy the calciner. Fluidized bed calciners may not suffer from this limitation and may be enabled by the calcium carbonate crystal aggregates formed in the disclosed processes.

In some aspects, one or more of the disclosed processes or apparatus may not require expensive and complicated washing of the $CaCO_3$. For example, due to the low solution content, size and morphology of the calcium carbonate crystal aggregates, washing and removal of solution content from the crystal aggregates can be accomplished using equipment such as vibrating screens and spray washing. These equipment options may be less complicated and less expensive than pressurized tubular filters or pressurized disc filters, which need to be used to undertake similar washing of solids streams containing finer particles with higher solution content, such as lime mud.

In some aspects, one or more of the disclosed processes or apparatus may enable the use of drying equipment that is sensitive to fouling or small particle sizes. For example, due to the size and morphology of the calcium carbonate crystal aggregates, fluidized bed dryers can be employed, which can make use of heat supplied using advanced drying methods like super-heated steam dryers, vapour recompression dryers, and in-bed heat exchange tubes. For example, the vapour recompression (e.g., electrical energy that drives a heat pump) achieved in evaporators, can use very little electricity per amount of water evaporated and as a result can achieve Coefficients Of Performance (COP) upwards of 60. The COP of 60 is defined as delivering up to 60 kJ of heat by consuming 1 kJ of electricity. In addition, fluidized bed dryers could operate on low grade heat which could be below or only slightly above 100° C., taken from hot fluids from other points in the disclosed processes.

In some aspects, calcination equipment such as fluidized bed calciners, where the system is well mixed and distribution of heat is more effective than rotary kiln calciners, may produce a CaO product stream that contains less over burnt (e.g., contains more reactive CaO per mass of solids processed) material than produced by a rotary kiln, because the solids are not exposed to hot spots during calcination. This may reduce the required capacity or size of the calciner and downstream equipment to achieve a desired CaO production rate and the rate at which chemicals such as calcium need to be replaced, resulting in a more efficient use of equipment capacities and reduced operating costs.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

FIGS. 7A-7C illustrate example implementations of a system for capturing atmospheric carbon dioxide.

DETAILED DESCRIPTION

Figure 1:
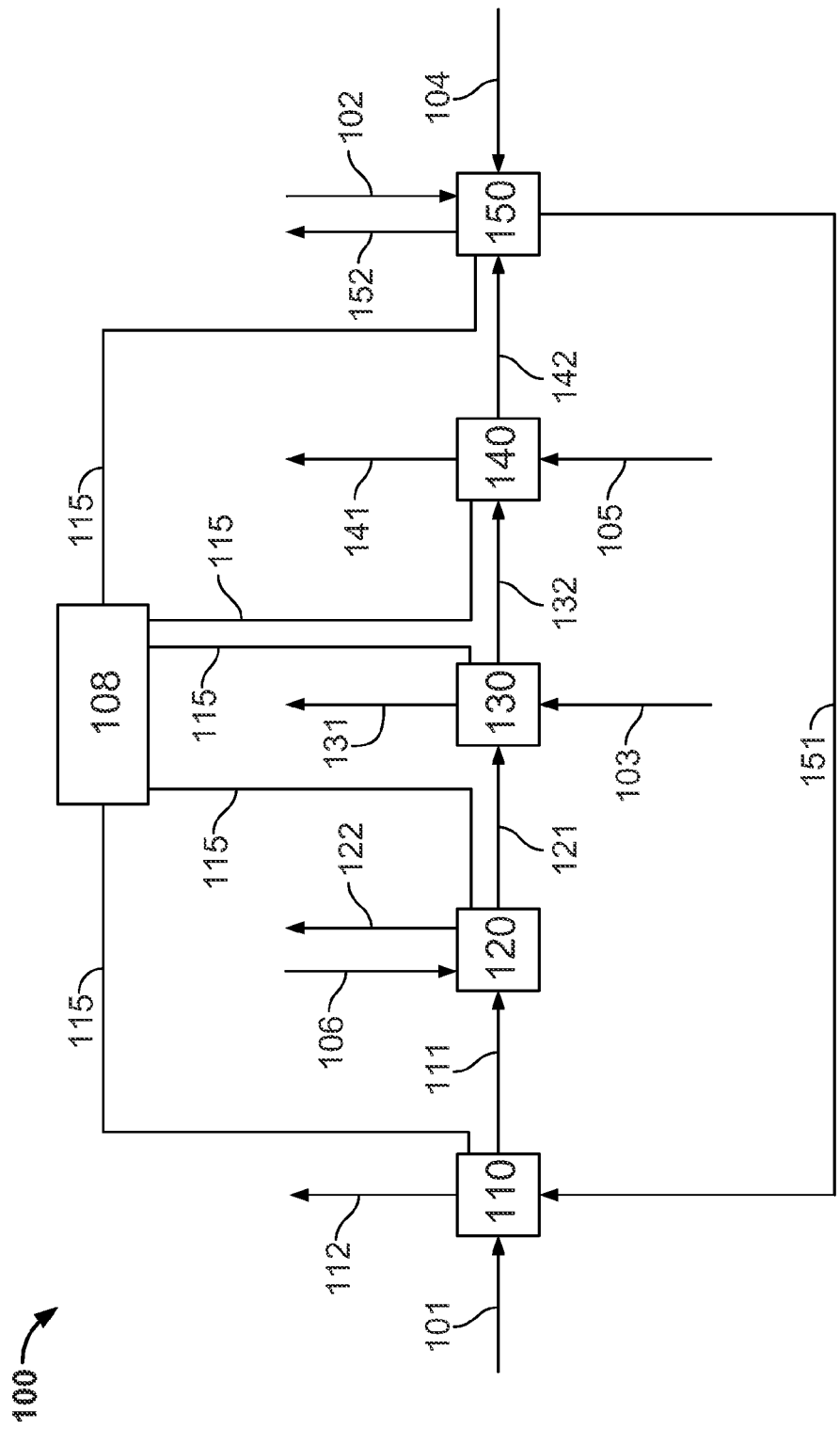
FIG. 1 illustrates an example process for growing and processing calcium carbonate crystal aggregates to convert a portion of carbonate content in a liquid stream to hydroxide.

FIG. 1 illustrates an example process 100 which grows and processes calcium carbonate crystal aggregates to convert a portion of carbonate content of a liquid stream to hydroxide. As illustrated, the example process 100 includes a unit 110 (e.g., a slaker unit), a fluidized bed reactive crystallizer 120, a separation and washing station 130, a dryer 140, a calciner 150, and a control system 108.

The first step in this example process reacts calcium oxide with water to form calcium hydroxide in unit 110 (e.g., an industrial lime slaker) via reaction (1) above. The water used in this reaction can be either in the liquid or gaseous state. When the water is in a liquid state the reaction may be carried out in a mixed tank reactor, one example being industrial lime slakers, with an integral method of removing and disposing of un-reactable contaminants as stream 112. Stream 101 of water fed into this device serves two purposes, first a portion of the water is consumed by the reaction to form the calcium hydroxide via reaction (1) and second an excess of water must be added to produce a transportable slurry of calcium hydroxide labelled as stream 111. The properties of the calcium hydroxide slurry stream 111 are selected and controlled to meet the requirements for the subsequent processing units. If the water in stream 101 delivered to unit 110 contains dissolved carbonate the produced calcium hydroxide will spontaneously react with these compounds, via reaction (2) above, in an uncontrolled manner to produce a precipitate of calcium carbonate. This precipitate will consist of particles each having a volume less than that of a 100 micron diameter sphere which is undesirable for the process described herein. To reduce this uncontrolled reaction, at least 10 times more moles of calcium oxide should be supplied to this processing step than the moles of dissolved carbonate entering with the water as a part of stream 101.

Once the calcium hydroxide slurry (stream 111) is produced it is transferred to unit 120 which grows calcium carbonate crystal aggregates by reacting the calcium hydroxide slurry with the dissolved carbonate content in liquid stream 106 in a controlled manner via reaction (2). This reaction is carried out in a fluidized bed reactive crystallizer, unit 120, which has been optimized to operate in a high pH environment. One example of unit 120 could be a Crystalactor® or pellet reactor. The calcium hydroxide slurry of stream 111 is metered into this device to control the rate at which calcium carbonate is formed and the device is arranged such that reaction (2) occurs in close proximity to growing calcium carbonate crystal aggregates. As a result of controlling the rate of reaction (2) and the environment as reaction (2) occurs, calcium carbonate crystal aggregates, each having an average volume equivalent to spheres with diameters between 0.1 mm and 2 mm, are produced. The liquid from this equipment has had a portion of the carbonate converted to hydroxide and it is discharged as the product hydroxide stream 122 while the solid calcium carbonate crystal aggregates which have grown to the desired size are removed from the fluidized bed reactive crystallizer as a mixture of solution and calcium carbonate crystal aggregates and sent onward to the next processing step as stream 121. Unit 120 could be supplied with seed material to facilitate the growth of the solid calcium carbonate crystal aggregates. The seed material could be made by crushing or grinding a portion of the produced calcium carbonate crystal aggregates or supplied from an external source, such as limestone or sand.

Due to the size, morphology, and physical properties of the calcium carbonate crystal aggregates in stream 121 they can be easily separated from the solution in stream 121, such that the accompanying solution after separation is less than 15% of the total weight of the calcium carbonate crystal aggregates, in unit 130 using industrial separation equipment such as screens or spiral classifiers. The calcium carbonate crystal aggregates are then washed with stream 103 which includes clean water and removes a majority of any residual solution on the calcium carbonate crystal aggregate surface. The solution and water removed in this processing step can both be delivered as part of the hydroxide stream 131 or recycled back to the fluidized bed reactive crystallizer. The calcium carbonate crystal aggregates which have now been separated from the hydroxide solution are sent as stream 132 to a drying system (unit 140) which vaporizes any residual moisture.

The calcium carbonate crystal aggregates in this process carry very little water on their surface after they are separated from solution in unit 130 and are then processed by drying unit 140 to remove this residual moisture. The residual moisture, in either liquid or vapour phase, is discharged from the process as a portion of stream 141. Due to the size and morphology of the crystal aggregates, fluidized bed dryers can be employed as unit 140 which can make use of heat supplied using advanced drying methods like super-heated steam dryers, vapour recompression dryers, and in bed heat exchange tubes. Specifically, fluidized bed dryers could operate on low grade heat which could be below or only slightly above 100° C., hot gases from other points in the process, or in the case of vapour recompression systems, electrical energy drives a heat pump which could deliver up to 60 kJ of heat by consuming 1 kJ of electricity. Alternatively, the dryer 140 may be a contact dryer such as, for example, vacuum tray, vertical agitated, double cone, horizontal pan, plate, vacuum band, horizontal, paddle or indirect rotary dryers. The dryer 140 may also be a dispersion convective dryer other than a fluidized bed dryer, such as spouted bed, direct rotary and pneumatic conveying dryers, or layer convective dryers such as convective tray, through-circulation, turbo-tray, tunnel, moving bed, paddle, or a rotary-louvre dryer.

In addition to the calcium carbonate crystal aggregates in stream 132, stream 105 of make-up calcium carbonate is introduced into drying unit 140 to account for losses of calcium compounds throughout the process. The source of make-up calcium carbonate could be limestone. Stream 142 of dry calcium carbonate crystal aggregates and make-up calcium carbonate are now ready for the final processing step.

The calcium carbonate crystal aggregates are then reacted to reform the calcium oxide which was used in the first step in the process and release a gas stream containing $CO_2$ via reaction (3) above. This reaction takes place at 900° C., requires heat energy as an input, and is carried out in unit 150, commonly known as calciner. The heat could be supplied to the calciner by the combustion of hydrocarbons such as natural gas, fuel oil, or coal, biomass, the use of solar heat, electricity, or a combination thereof.

The calciner (e.g., unit 150) employed could be a rotary kiln, shaft kiln, flash calciner, or fluidized bed calciner. In some embodiments, the necessary heat is supplied when stream 104 of fuel is combusted with the oxygen in gas stream 102 which could consist of air or oxygen from an air separation unit (ASU). The products from combustion of fuel and the $CO_2$ from reaction (3) mix together and are discharged from calcining unit 150 as off-gases 152. The washing previously described and only achievable with the calcium carbonate crystal aggregates enables the use of fluidized bed calciners, which are desirable because they are inherently easy to control and have very uniform internal conditions, both are factors which lead to more reactive CaO in stream 151 with less material which has been over heated, over-burnt or sintered and of which must be disposed. Stream 151 is returned to unit 110 such that the process can be repeated. Stream 152 of off-gases are hot and could be used to preheat streams 102, 104, or 142 before they enter the calcination unit 150, as the heat source for drying unit 140, or to generate steam in a boiler. Stream 152 can be applied to these various processes because a majority of the solution was removed in unit 130, and the size and morphology of the calcium carbonate crystal aggregates prevents contamination of stream 152 with unmanageable quantities of dust from stream 142 or steam 151 or chemicals from stream 121. Once the heat in stream 152 has been used as described above the resultant gases could be delivered to a consumer of $CO_2$ enriched air such as a greenhouse or algaculture facility.

Process 100 also includes a control system 108 that is communicably coupled to at least one of the unit 110 (e.g., slaker), the fluidized bed reactive crystallizer 120, the separation and washing station 130, the dryer 140, and the calciner 150 through communication elements 115. Implementations of the control system 108 can include digital electronic circuitry, or computer software, firmware, or hardware, including the structures disclosed in this specification and their structural equivalents, or combinations of one or more of them. For example, the control system 108 can be a microprocessor based controller (or control system) as well as an electro-mechanical based controller (or control system). Instructions and/or logic in the control system (e.g., to control the process 100 or other processes implemented by the unit 110 (e.g., slaker), the fluidized bed reactive crystallizer 120, the separation and washing station 130, the dryer 140, and the calciner 150) can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated non-transitory signal, e.g., a machine-generated electrical, optical, or electromagnetic signal that is generated to encode information for transmission to suitable receiver apparatus for execution by a data processing apparatus.

The control system 108 can include clients and servers and/or master and slave controllers. A client and server are generally remote from each other and typically interact through a communication network. The relationship of client and server arises by virtue of computer programs running on the respective computers and having a client-server relationship to each other. In some aspects, the control system 108 represents a main controller (e.g., master) communicably coupled through communication elements 115 (e.g., wired or wireless) with each of the illustrated components of the process 100.

Figure 2:
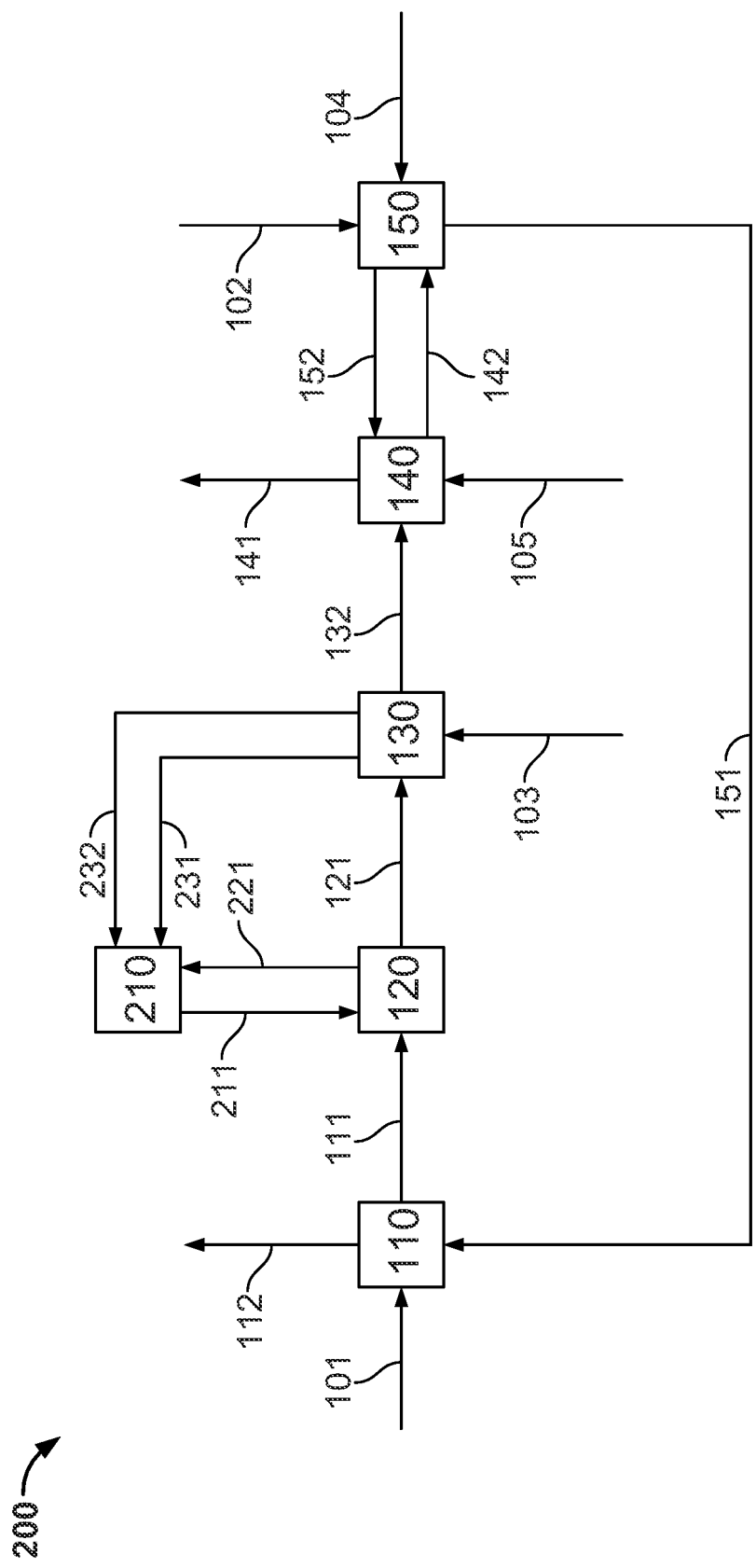
FIG. 2 illustrates an example process for growing and processing calcium carbonate crystal aggregates to convert clarified green liquor from a pulp plant to clarified white liquor.

FIG. 2 illustrates an example process 200 for growing and processing calcium carbonate crystal aggregates to convert a portion of the carbonate content in the liquid stream (known as green liquor) from a pulp plant to hydroxide and deliver the resulting stream to the pulp plant as clarified white liquor. Process 200, as illustrated, includes a pulp plant 210 in material communication with the fluidized bed reactive crystallizer 120, and the separation and washing unit 130. Further, process 200 includes, in the illustrated implementation, the unit 110 (e.g., slaker), the dryer 140, and calciner 150.

In the illustrated process 200, the pulp plant unit 210 uses clarified white liquor stream 221 from fluidized bed reactive crystallizer 120 and clarified white liquor stream 231 from unit 130 to process or cook wood chips during the pulp making process. The caustic wash water stream 232 from separation and washing unit 130 may be combined with the black liquor in the pulp plant 210 to produce carbonate rich green liquor stream 211 which is supplied to the fluidized bed reactive crystallizer unit 120. Therefore, in some aspects, the process provides at least clarified white liquor to the pulp plant, and in turn the process receives the carbonate rich green liquor from the pulp plant.

In some aspects, the slaking unit 110 as employed in this embodiment operates in the same or similar manner, using the same or similar input material streams and outputting the same or similar materials as shown in FIG. 1 and described in the first embodiment.

Once the calcium hydroxide slurry (stream 111) is produced it is transferred to unit 120 which grows calcium carbonate crystal aggregates by reacting the calcium hydroxide slurry with the green liquor stream 211 discharged from the pulp plant unit 210. The calcium hydroxide reacts with the dissolved carbonate content of stream 211 in a controlled manner via reaction (2). This reaction is carried out in a fluidized bed reactive crystallizer (trade name: Crystalactor® or pellet reactor) which has been optimized to operate in a high pH environment. The calcium hydroxide slurry of stream 111 is metered into this device to control the rate at which calcium carbonate is formed and the device is arranged such that reaction (2) occurs in close proximity to growing calcium carbonate crystal aggregates. As a result of controlling the rate of reaction (2) and the environment as reaction (2) occurs, calcium carbonate crystal aggregates with average volumes equivalent to spheres with diameters between 0.1 mm and 2 mm are produced. The liquid from this equipment has had a portion of the carbonate converted to hydroxide and it is discharged back to the Pulp Plant unit 210 as the product clarified white liquor stream 221 while the solid calcium carbonate crystal aggregates which have grown to the desired size are removed from the fluidized bed reactive crystallizer as a mixture of solution and calcium carbonate crystal aggregates and sent onward to the next processing step as stream 121.

Due to the size, morphology, and physical properties of the calcium carbonate crystal aggregates in stream 121 they can be almost completely separated from the solution in stream 121, such that the accompanying solution after separation is less than 15% of the total weight of the calcium carbonate crystal aggregates, in unit 130 using industrial separation equipment such as screens or spiral classifiers. The undiluted hydroxide solution is sent back to the Pulp Plant (unit 120) as stream 231 and has similar properties to clarified white liquor in the pulping process. The calcium carbonate crystal aggregates are then washed with stream 103 which consists of clean water and removes a majority of any residual solution on the calcium carbonate crystal aggregate surface. The spent caustic wash water (stream 232) is also sent back to the Pulp plant (unit 210), to be used to dissolve the black liquor and form green liquor. The solution and water removed in this processing step could instead be recycled back to the fluidized bed reactive crystallizer unit 120. The calcium carbonate crystal aggregates which have now been washed and separated from the hydroxide solution are sent as stream 132 to a drying system which vaporizes any residual moisture.

In some aspects, the drying unit 140 and calcination unit 150 as employed in this embodiment operate in the same or similar manner, using the same or similar input material streams and outputting the same or similar materials as shown in FIG. 1 and described in the first embodiment. However, in this embodiment, stream 152 of hot gases leaving the calcination unit 150 are used to dry and preheat stream 132.

Figure 3A:
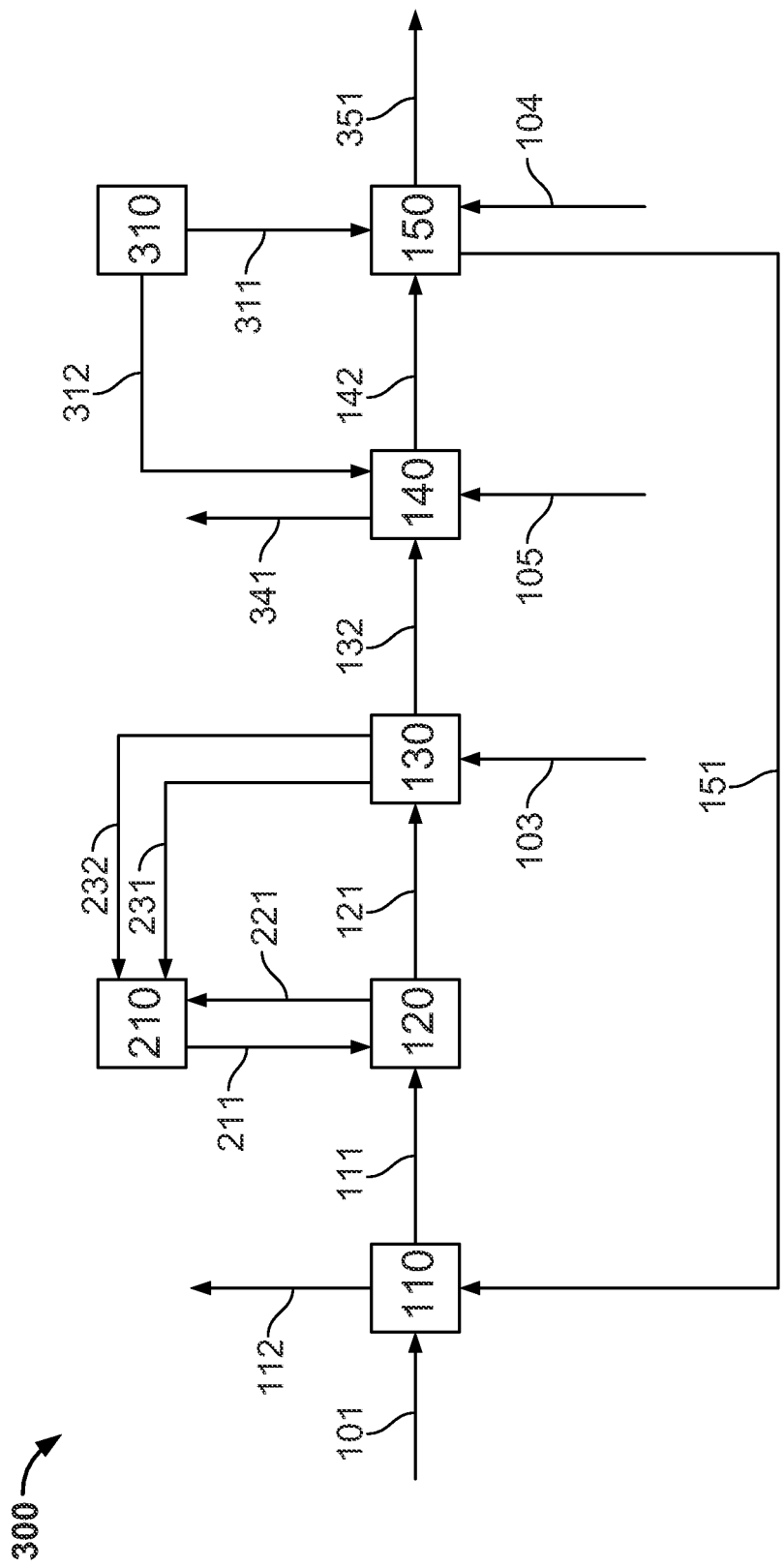
FIG. 3A illustrates an example process for growing and processing calcium carbonate crystal aggregates to convert clarified green liquor from a pulp plant to clarified white liquor, in association with an oxy-fired calciner, and $CO_2$ capture.

FIG. 3A illustrates an example process 300 for growing and processing calcium carbonate crystal aggregates to convert a portion of the carbonate content in the green liquor stream in a pulp plant to hydroxide and includes an oxy-fired calciner and $CO_2$ capture. The example process 300, as shown, includes an ASU 310 in material communication with the dryer 140 and the calciner 150. The example process 300 also includes the unit 110 (e.g., slaker), the fluidized bed reactive crystallizer 120, and the separation and washing unit 130.

In the illustrated process 300, the illustrated pulp plant unit 210 uses clarified white liquor stream 221 from fluidized bed reactive crystallizer 120 and stream 231 from unit 130 to process or cook wood chips during the pulp making process. The caustic wash water stream 232 from separation and washing unit 130 may be combined with the black liquor in the pulp plant 210 to produce carbonate rich green liquor stream 211 which is supplied to the fluidized bed reactive crystallizer unit 120. Therefore, in some aspects, the process provides at least clarified white liquor to the pulp plant, and in-turn receives the carbonate rich green liquor from the pulp plant.

In some aspects, the slaking unit 110 as employed in this embodiment operates in the same or similar manner, using the same or similar input material streams and outputting the same or similar materials as shown in FIG. 1 and described in the first embodiment.

In some aspects, the fluidized bed reactive crystallizer unit 120 and the separation and washing unit 130 as employed in this embodiment operates in the same or similar manner, using the same or similar input material streams and outputting the same or similar materials as shown in FIG. 2 and described in the second embodiment.

The calcium carbonate crystal aggregates in this process carry very little water on their surface after they are separated from solution in unit 130 and are then processed by drying unit 140 to remove this residual moisture. The residual moisture, in either liquid or vapour phase, is discharged from the process as a portion of stream 341. Due to the size and morphology of the calcium carbonate crystal aggregates fluidized bed dryers can be employed as unit 140. In this implementation, a stream of dry gas consisting of primarily nitrogen (stream 312) is taken from the ASU unit 310 and used to dry the solids in unit 140. In addition to the calcium carbonate crystal aggregates in stream 132, stream 105 of make-up calcium carbonate is introduced into drying unit 140 to account for losses of calcium compounds throughout the process. Stream 142 of dry calcium carbonate crystal aggregates and make-up calcium carbonate are now ready for the final processing step.

The calcium carbonate crystal aggregates are then reacted to reform the calcium oxide which was used in the first step in the process and release a gas stream containing $CO_2$ via reaction (3) above. This reaction takes place at 900° C., requires heat as an input, and is carried out in unit 150 which is commonly referred to as a calciner. The calciner employed is a fluidized bed calciner. To supply the necessary heat, stream 104 of fuel such as natural gas or oil is combusted with a high purity oxygen stream 311. Stream 311 is produced from the ASU unit 310. The use of high purity oxygen leads to the unit 150 calciner configuration being termed an oxy-fired calciner. Supplying pure oxygen to the calciner reduces the energy consumption and increases the unit capacity of the calciner. The products from combustion of fuel and the $CO_2$ from reaction (3) mix together and are discharged from calcining unit 150 as off-gases (stream 351). The off-gases contain a high concentration of $CO_2$ and could be used in the LignoBoost™ process within the pulp plant unit 210, sold for use in EOR operations, or stored in an underground reservoir.

As in this implementation and other implementations where capturing and purification of the produced $CO_2$ is desired, the calcium carbonate crystal aggregates enable the use of an oxy-fired calcining process. In some aspects, types of oxy-fired calciners (e.g., enabled by the calcium carbonate crystal aggregates) other than a rotary kiln may be used (e.g., due to air-tightness). In some cases, producing 2 moles of oxygen with an ASU to combust a mole of fuel costs approximately the same as capturing the produced mole of $CO_2$ with an amine unit. The complete combustion of methane gas is shown below to aid in exemplifying this concept:

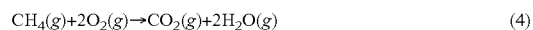

$$CH_4(g)+2O_2(g) \rightarrow CO_2(g)+2H_2O(g) \quad (4)$$

$ for ASU to make 2 mole $O_2$=$ for Amine to capture 1 mole $CO_2$

About one-third of the total $CO_2$ leaving the calciner in this embodiment is from the combustion of fuel with the rest being from the calcination of $CaCO_3$ via the reaction (3), making the complete series of reactions in the oxy-fired calciner:

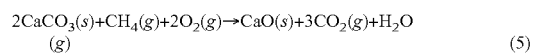

$$2CaCO_3(s)+CH_4(g)+2O_2(g) \rightarrow CaO(s)+3CO_2(g)+H_2O(g) \quad (5)$$

Therefore, an ASU need only produce the 2 moles of oxygen to combust the fuel while an amine unit would need to capture 3 moles of $CO_2$. This will equate to a roughly 67% reduction in the cost of capturing $CO_2$ from this process as compared to use of an amine unit.

Such an oxy-fired scheme has benefits to the process beyond the reduction in the cost of capturing $CO_2$. First, the ASU will co-produce a large stream of very dry $N_2$. This can be used as the fluidizing gas to the fluidbed dryer (unit 140) and any water on the calcium carbonate crystal aggregates will vapourize into this gas stream to reach the equilibrium water vapour pressure. Depending upon how wet the calcium carbonate crystal aggregates are it may be possible to dry them without any external heat input which will completely eliminate any energy requirements for the drying of the calcium carbonate crystal aggregates.

In addition, calciner capacities are determined by the amount of oxygen they can process per second. They are normally run on air which contains 21% oxygen, but if they are fed a stream of pure oxygen the capacity will increase by a factor of 5 since calciner capacity is linearly related to oxygen processing rate and a given size of calciner can process a given volume of gas. Most calciners, such as rotary kilns, may not be able to run on pure oxygen because they may not have intense enough mixing of solids and gases and the flame temperature in a pure oxygen environment results in hot spots which will destroy the calciner and over heat the calcium oxide rendering it inert. Fluidized bed calciners do not suffer from this limitation and are enabled by the calcium carbonate crystal aggregates formed in this process.

Figure 3B:
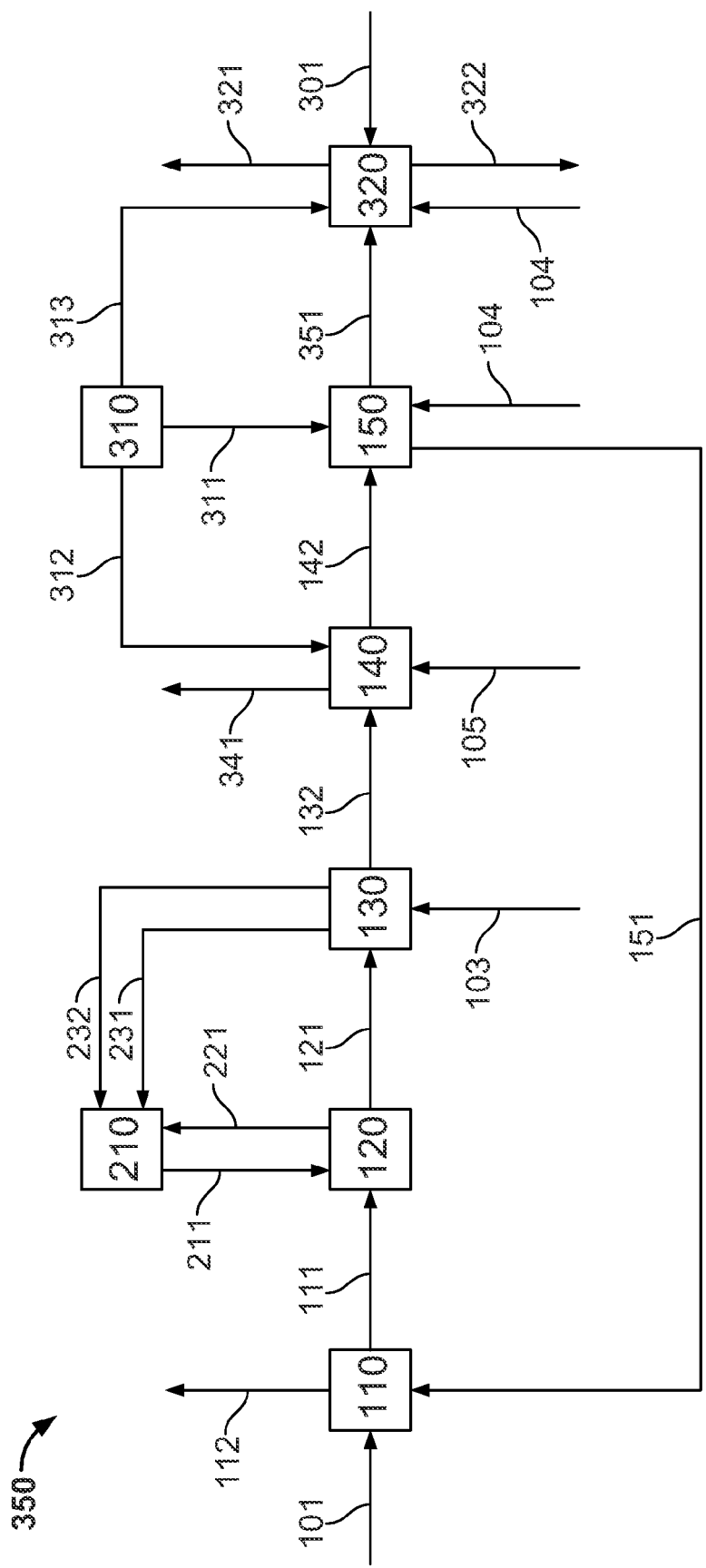
FIG. 3B illustrates an example process for growing and processing calcium carbonate crystal aggregates to convert clarified green liquor from a pulp plant to clarified white liquor, in association with an oxy-fired calciner, $CO_2$ capture, and $CO_2$-free power production using an auxiliary boiler.

FIG. 3B illustrates an example process 350 for growing and processing calcium carbonate crystal aggregates to convert a portion of carbonate in green liquor stream from a pulp plant to hydroxide, in association with an ASU, an oxy-fired calciner, a boiler, and $CO_2$ capture. The example process 350, as shown, includes an ASU 310 in material communication with the dryer 140, the calciner 150 (e.g., an oxy-fired calciner) and the boiler 320. The example process 350 also includes the unit 110 (e.g., slaker), the fluidized bed reactive crystallizer 120, and the separation and washing unit 130.

In the illustrated process 350, the illustrated pulp plant unit 210 uses clarified white liquor stream 221 from fluidized bed reactive crystallizer 120 and stream 231 from unit 130 to process or cook wood chips during the pulp making process. The caustic wash water stream 232 from separation and washing unit 130 may be combined with the black liquor in the pulp plant 210 to produce carbonate rich green liquor stream 211 which is supplied to the fluidized bed reactive crystallizer unit 120. Therefore, in some aspects, the process provides at least clarified white liquor to the pulp plant, and in turn receives the carbonate rich green liquor from the pulp plant.

The slaking unit 110 as employed in this embodiment operates in the same or similar manner, using the same or similar input material streams, and outputting the same or similar materials as shown in FIG. 1 and described in the first embodiment.

In some aspects of this embodiment, units 120, 130, 140, and 150 operate in the same or similar manner, using the same or similar input material streams, and outputting the same or similar materials as shown in FIG. 3A and described in the third embodiment, except the hot gases in stream 351 are delivered to an auxiliary boiler unit 320.

Figure 6:
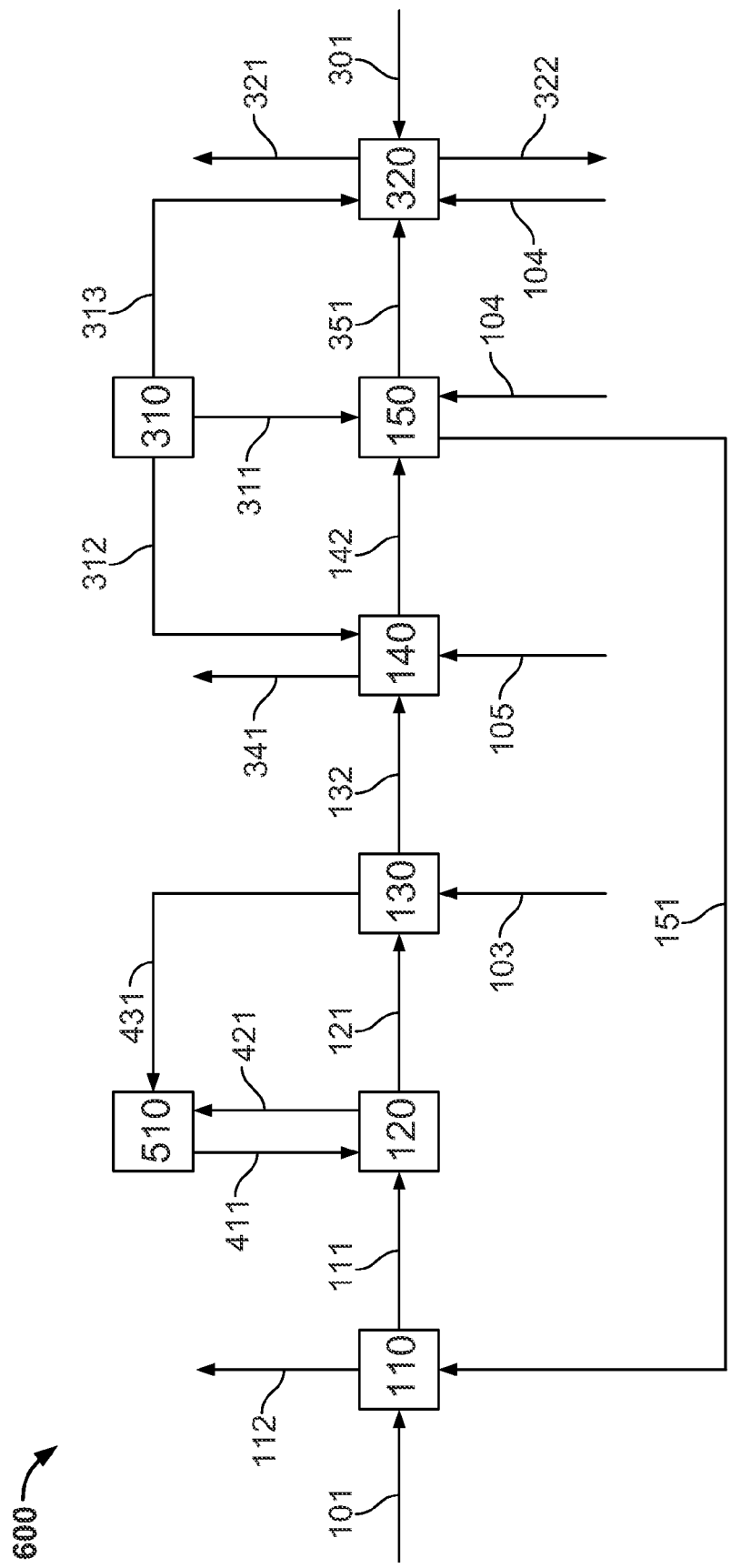
FIG. 6 illustrates an example process for growing and processing calcium carbonate crystal aggregates to convert a portion of carbonate content in a liquid stream in an air-capture plant to hydroxide, in association with a gas absorber, oxy-fired calciner, $CO_2$ capture, and $CO_2$-free power production using an auxiliary boiler.

The auxiliary boiler is desired so that $CO_2$ free power can be produced. It is integrated with the oxy-fired calciner, as depicted in FIGS. 3B and 6. Here, the calciner off-gas (stream 351) enters the auxiliary boiler and is mixed with additional high purity oxygen (stream 313) from the ASU unit 310. A fuel source such as natural gas or oil is introduced as stream 104 and the resulting combustion reaction produces heat to convert the incoming boiler feed water (stream 301) into steam (stream 322). This steam can then be used for power generation. The resulting boiler off-gases (stream 321) contain high $CO_2$ content and could be used in the LignoBoost™ process within the pulp plant unit 210, sold for use in EOR operations, or stored in an underground reservoir.

A separate boiler (e.g., in addition to the components shown in process 300) could be setup which takes in oxygen, dilutes it with $CO_2$ recycled from its own off-gases and burns natural gas in the resulting mixed stream. In a boiler, the oxygen may be diluted because otherwise the flame temperature will be high enough to melt through the boiler tubes. The separate boiler as mentioned above may require a completely separate stream of oxygen supply to the auxiliary boiler 320. In this implementation, instead of recycling the $CO_2$ generated in the boiler back to the inlet of the boiler, the off-gases from the calciner (stream 351) are used to dilute the oxygen, as shown by stream 351. Calciners are generally run with excess oxygen and this excess oxygen will still be in the off-gases leaving the calciner (stream 351). This excess oxygen can make-up some or all of the oxygen required to combust the fuel 104 in the auxiliary boiler 320, which reduces the total amount of oxygen used by the process (and therefore the size and cost of the ASU). Any heat remaining in the off-gases from the calciner is also delivered to the boiler and is used to generate steam. The above two factors reduce the cost of producing $CO_2$-free power.

Figure 4:
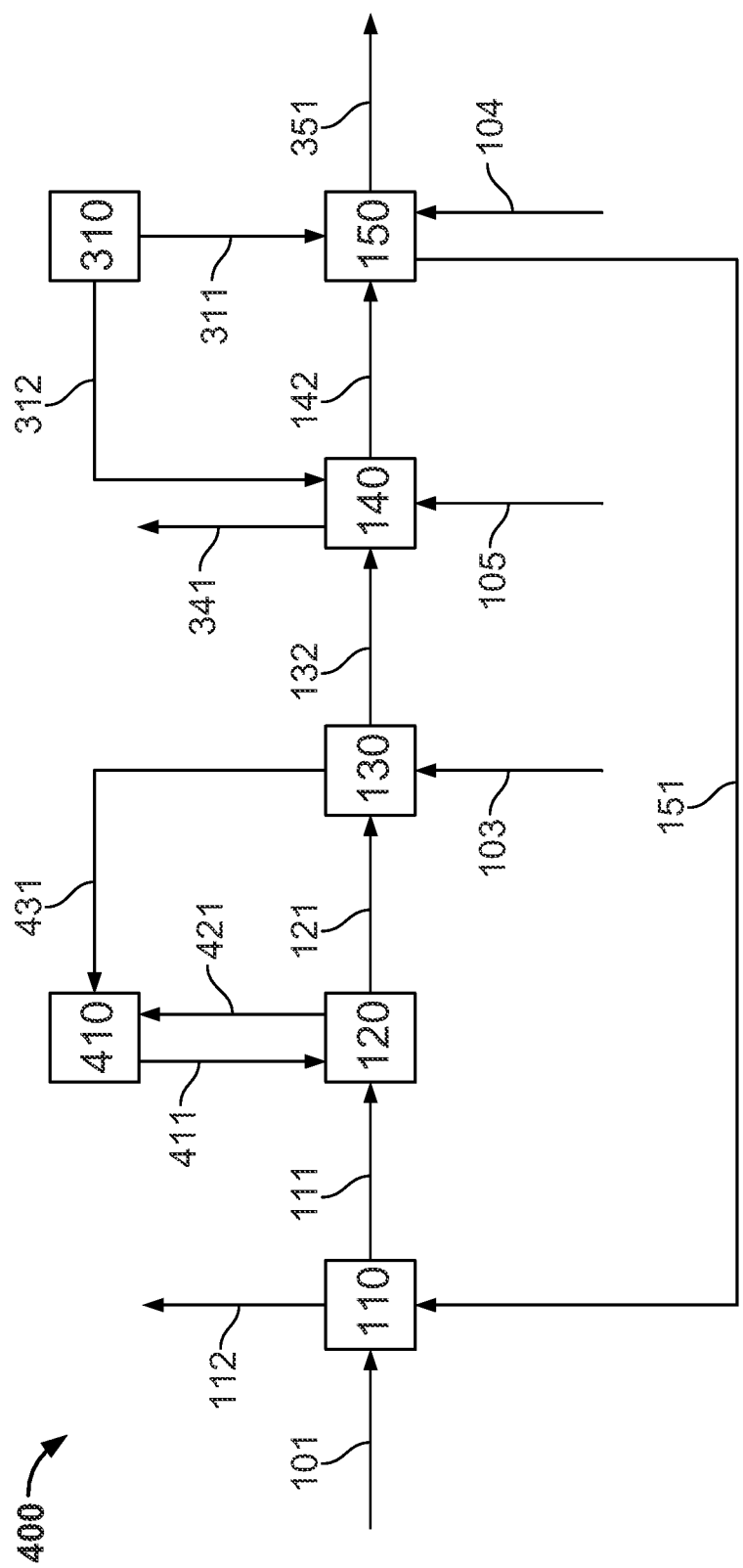
FIG. 4 illustrates an example process for growing and processing calcium carbonate crystal aggregates to convert a portion of carbonate content in a liquid stream in an industrial plant to hydroxide, in association with an oxy-fired calciner, and $CO_2$ capture.

FIG. 4 illustrates an example process 400 for growing and processing calcium carbonate crystal aggregates to convert a portion of carbonate in a liquid stream to hydroxide as applied in an industrial process, with an oxy-fired calciner and $CO_2$ capture. The example process 400, as shown, includes an ASU 310 in material communication with the dryer 140 and the calciner 150. The example process 400 also includes the unit 110 (e.g., slaker), the fluidized bed reactive crystallizer 120, the separation and washing unit 130, and a calciner 150 (e.g., an oxy-fired calciner).

In the illustrated process 400, the industrial gas absorber unit 410 absorbs a fraction of $CO_2$ from gaseous industrial process streams using a combination of $CO_2$-lean stream 421 from the fluidized-bed reactive crystallizer 120 and dilute $CO_2$-lean stream 431 from separation and washing unit 130. In some aspects, "$CO_2$-lean" may refer to a stream that contains less $CO_2$ in terms of carbonate salts than that in the associated $CO_2$-rich stream. For example, in some aspects, the ratio of carbonate concentration ($[CO_3^{2-}]$) to hydroxide concentration ($[OH^-]$) is higher in a $CO_2$-rich stream than that in the $CO_2$-lean stream. For example, if a $[CO_3^{2-}]$:$[OH^-]$ ratio in the $CO_2$-lean solution is 0.25 ($[CO_3^{2-}]$=0.5, $[OH^-]$=2.0), then the $[CO_3^{2-}]$:$[OH^-]$ ratio in the $CO_2$-rich stream will be more than 0.25; for example 0.3 ($[CO_3^{2-}]$=0.6 and $[OH^-]$=1.8). After the absorption of $CO_2$, the industrial gas absorber returns the resulting $CO_2$-rich stream 411 to unit 120. The term "$CO_2$-rich," in some aspects, may mean that a stream contains more $CO_2$ than the associated $CO_2$-lean stream (in this case, streams 421 and 431). Therefore, in some aspects, the process provides at least $CO_2$ lean solution to the industrial gas absorber, and in-turn receives the $CO_2$ rich solution from the industrial gas absorber.

Industrial gas absorbers are columns that take in gases emitted from industrial processes, such as refinery flue gases and boiler exhaust gases, and bring them into contact with a $CO_2$-lean absorbing fluid that absorbs a portion of the $CO_2$ (and in some cases $SO_2$, $H_2S$ and other compounds). The discharged gas is sent to the next step in the process or in some cases discharged to the atmosphere while the resulting $CO_2$-rich absorbent fluid is sent to a regeneration unit where it is processed and converted back into $CO_2$-lean absorbent fluid and sent back to the gas absorber column. Industrial $CO_2$ capture deals with gases from sources such as power plants, where the $CO_2$ content in the gas can, for example, vary between 1-15 vol %. This range is higher than the $CO_2$ content found in air, which for example is less than 1 vol %. This means that the $CO_2$ partial pressure associated with the industrial gases is greater than the $CO_2$ partial pressure associated with the atmosphere. One embodiment of the process described herein is designed to capture $CO_2$ from the atmosphere, it can also be applied to capture $CO_2$ from industrial sources where the $CO_2$ partial pressure is greater and therefore easier to capture.

In some aspects, the slaking unit 110 as employed in this embodiment may operate in the same or similar manner, using the same or similar input material streams and outputting the same or similar materials as shown in FIG. 1 and described in the first embodiment.

Once the calcium hydroxide slurry (stream 111) is produced it is transferred to unit 120 which grows calcium carbonate aggregates by reacting the calcium hydroxide slurry with the $CO_2$-rich stream 411 discharged from the industrial gas absorber unit 410. The calcium hydroxide reacts with the dissolved carbonate content of stream 411 in a controlled manner via reaction (2). This reaction is carried out in a fluidized bed reactive crystallizer (trade name: Crystalactor® or pellet reactor) which has been optimized to operate in a high pH environment. The calcium hydroxide slurry of stream 111 is metered into this device to control the rate at which calcium carbonate is formed and the device is arranged such that the reaction to form the calcium carbonate occurs in close proximity to growing calcium carbonate crystal aggregates. As a result of controlling the rate of reaction (2) and the environment as reaction (2) occurs, calcium carbonate crystal aggregates with average volumes equivalent to spheres with diameters between 0.1 mm and 2 mm are produced. The liquid from this unit has had a portion of the carbonate converted to hydroxide and it is discharged back to the industrial gas absorber unit 410 as the $CO_2$-lean hydroxide solution stream 421 while the solid calcium carbonate crystal aggregates which have grown to the desired size are removed from the fluidized bed reactive crystallizer as a mixture of solution and calcium carbonate crystal aggregates and sent onward to the next processing step as stream 121.

Due to the size, morphology, and physical properties of the calcium carbonate crystal aggregates in stream 121 they can be almost completely separated from the solution in stream 121, such that the accompanying solution after separation is less than 15% of the total weight of the calcium carbonate crystal aggregates, by unit 130 using industrial separation equipment such as screens or spiral classifiers. The calcium carbonate crystal aggregates are then washed with stream 103 which consists of clean water and removes a majority of any residual solution on the calcium carbonate crystal aggregate surface. Both the spent caustic wash water and the undiluted hydroxide solution are mixed and sent back to the industrial gas absorber (unit 410) as the $CO_2$-lean solution stream 431. The solution and water removed in this processing step can both be delivered back to the industrial gas absorber unit 410 or recycled back to the fluidized bed reactive crystallizer unit 120. The calcium carbonate crystal aggregates which have now been washed and separated from the hydroxide solution are sent as stream 132 to a drying system which vaporizes any residual moisture.

In some aspects, units 140 and 150 as employed in this embodiment operate in the same or similar manner, using the same or similar input material streams, and outputting the same or similar materials as shown in FIG. 3A and described in the third embodiment. In this embodiment, the off-gases contain a high concentration of $CO_2$ and can be sent for further processing, purification and compression of $CO_2$ using commercially available technology before being delivered to off-takers or potential end users such as but not limited to sending $CO_2$ for sequestration in underground storage reservoirs such as saline aquifers, using $CO_2$ for Enhanced Oil Recovery (EOR) or Enhanced Gas Recovery (EGR) operations, using $CO_2$ in industrial processes for production of chemicals or consumer goods, for use in greenhouses or for production of algal biomass for production of biomass based products or energy. EOR is the process by which $CO_2$ can be injected into an oil reservoir to facilitate transport of the oil from the reservoir to the surface. EGR is a similar process to EOR but is applied to facilitate the transport of gas instead of oil.

Figure 5:
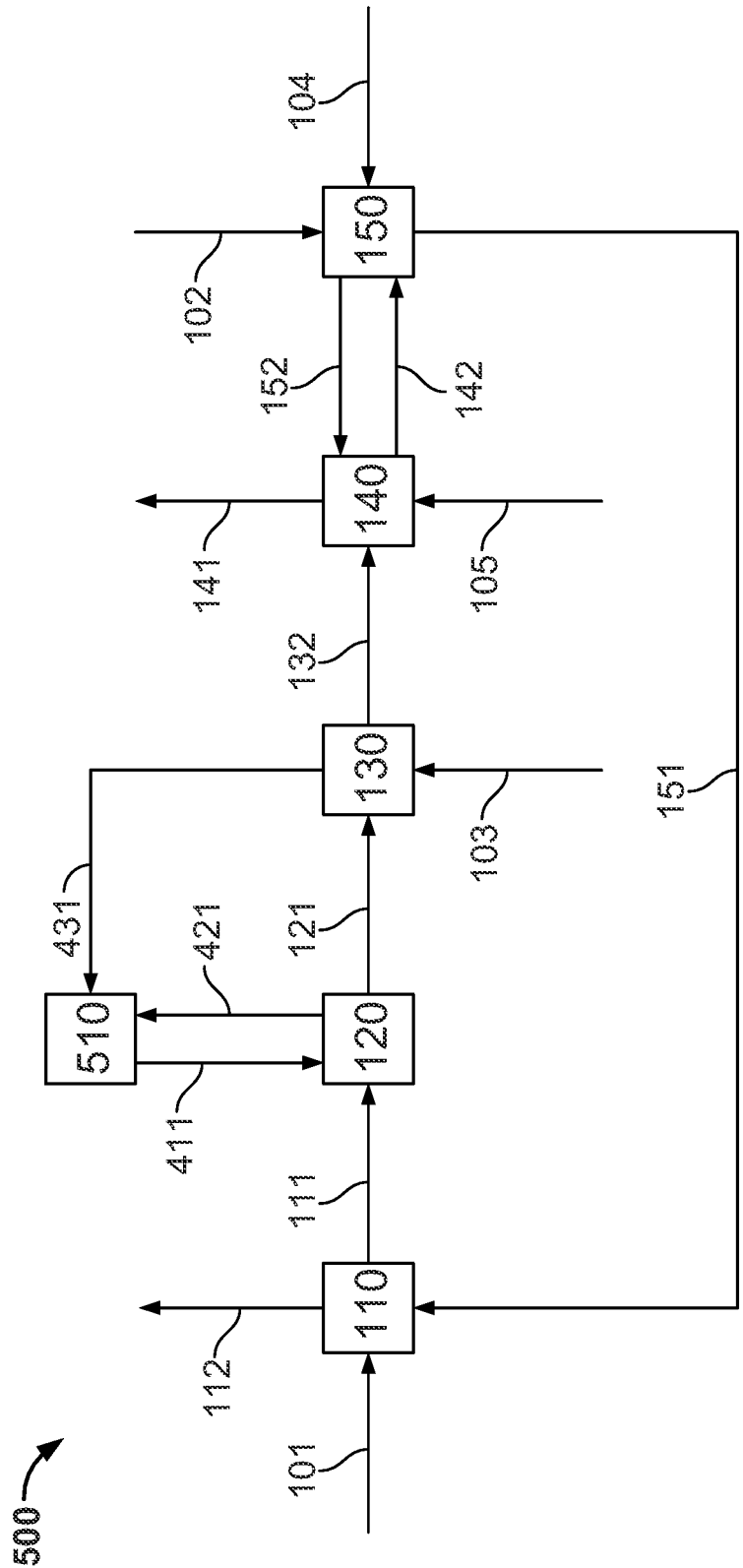
FIG. 5 illustrates an example process for growing and processing calcium carbonate crystal aggregates to convert a portion of carbonate content in a liquid stream in an air-capture plant to hydroxide, in association with an air-fired calciner, and $CO_2$ capture, and gas absorber.

FIG. 5 illustrates an example process 500 for growing and processing calcium carbonate crystal aggregates to convert a portion of carbonate in a liquid stream to hydroxide as applied in the process of capturing $CO_2$ from atmospheric air. Process 500, as illustrated, includes a gas absorber or air-absorber or air-contactor 510 in material communication with the fluidized bed reactive crystallizer 120 and the separation and washing station 130. Further, process 500 includes, in the illustrated implementation, the unit 110 (e.g., slaker), the dryer 140, and calciner 150.

In the illustrated process 500, the gas absorber unit 510 absorbs a fraction of $CO_2$ from atmospheric air using a combination of $CO_2$-lean solution stream 421 from the fluidized bed reactive crystallizer 120 and dilute $CO_2$-lean stream 431 from separation and washing unit 130. After the absorption of $CO_2$, the gas absorber returns the resulting $CO_2$-rich stream 411 to unit 120. Therefore, in one aspect, at least $CO_2$-lean solution may be provided to the gas absorber, and the process in-turn receives the $CO_2$ rich solution from the gas absorber.

Figure 7B:
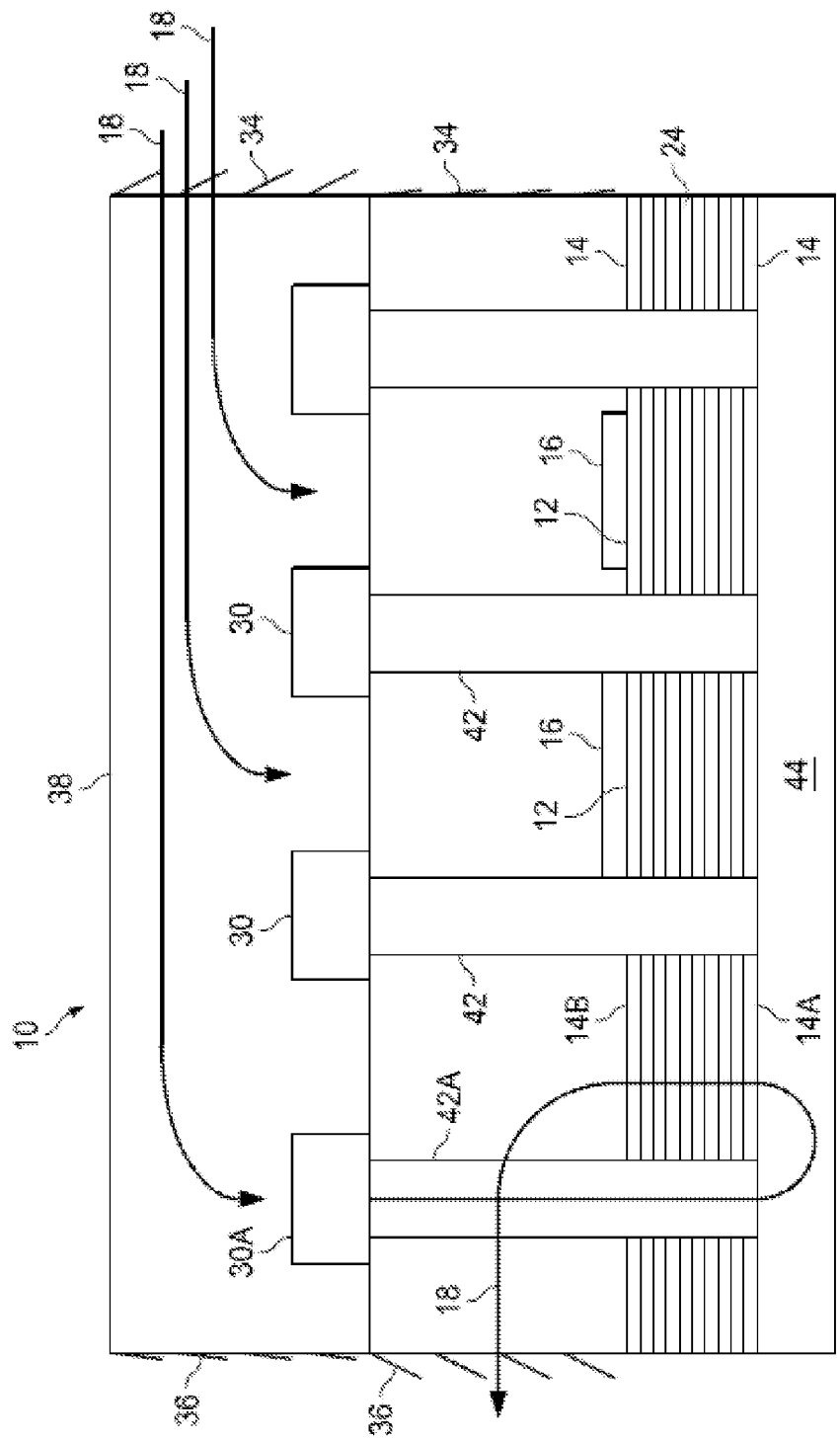
Figure 7C:
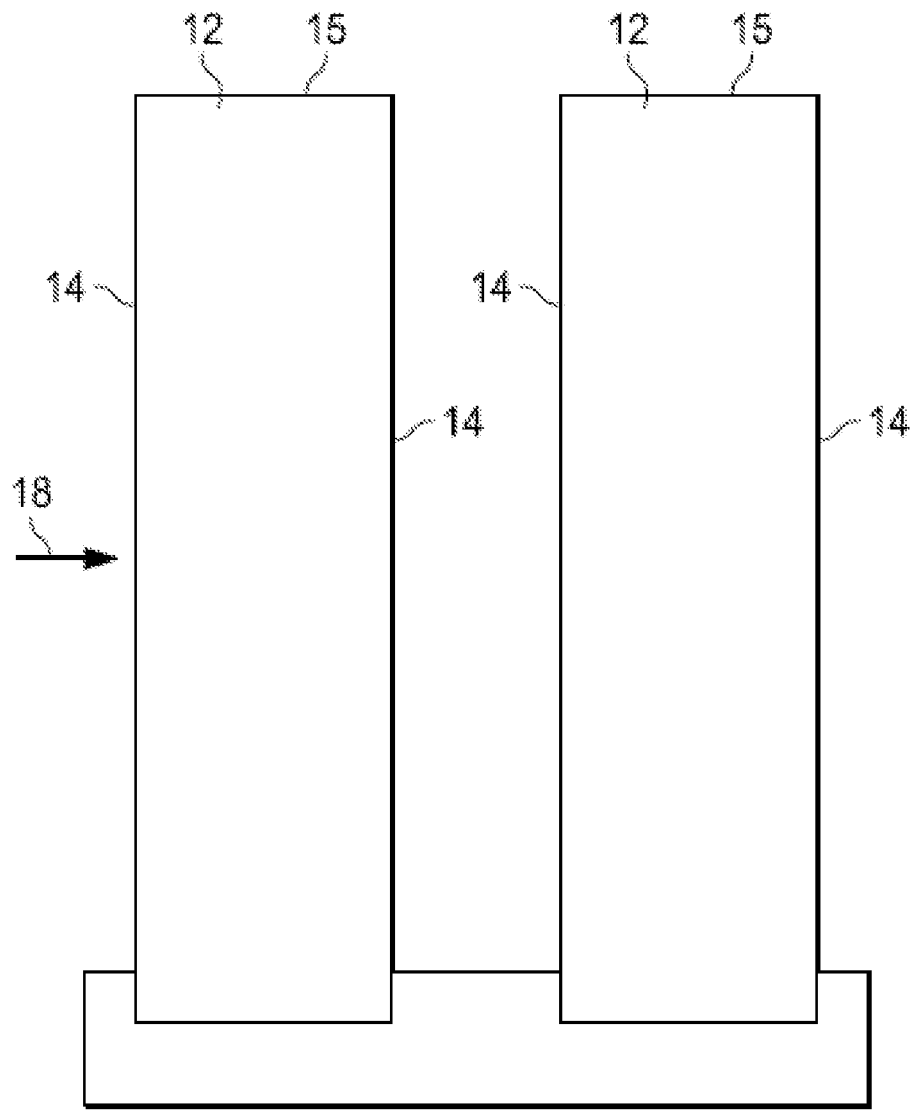

Turning briefly to FIGS. 7A-7C, example implementations of a system for capturing atmospheric carbon dioxide that could be implemented as gas absorber unit 510 are shown in more detail. For example, with reference to FIG. 7A in particular, a carbon dioxide capture facility 10 is illustrated including packing 12 formed as a slab 15, the slab 15 having opposed dominant faces 14, the opposed dominant faces 14 being at least partially wind penetrable to allow wind to flow through the packing 12. At least one liquid source 16 is oriented to direct carbon dioxide absorbent liquid into the packing 12 to flow through the slab 15. The slab 15 is disposed in a wind flow 18 that has a non-zero incident angle with one of the opposed dominant faces 14. The packing 12 may be oriented to direct the flow of carbon dioxide absorbent liquid through the slab 15 in a mean flow direction 20 that is parallel to a plane 22 defined by the opposed dominant faces 14. It should be understood that opposed dominant faces 14 don't have to be exactly parallel. In one implementation, the faces 14 may be converging, diverging, or curved for example. Packing 12 may be oriented to allow the carbon dioxide liquid absorbent to flow through the packing 12 by gravity, as illustrated. In some implementations, packing dimensions can be 200 m by 20 m by 3 m contained in a structure measuring 200 m by 25 m by 7 m. In some implementations, dimensions can range from 10 m by 7 m by 2 m to 1000 m by 50 m 15 m.

The non-zero incident angle refers to the fact that wind flow 18 strikes the face 14 at an angle greater than zero. This may be contrasted with traditional packing arrangements, where gas is flowed through a tower of packing starting from the very bottom. In some implementations, the non-zero incident angle is orthogonal with the one of the opposed dominant faces. It should be understood that the non-zero incident angle may be within 10% of exactly orthogonal. The non-zero incident angle may also refer to the mean angle of flow of the wind. The mean angle of flow of the wind may be averaged over a period of time.

In some implementations, the packing 12 further includes structured packing The packing 12 may be, for example, 1-2 meters thick between the opposed dominant faces 14. In other implementations, the packing 12 may be thicker or thinner. The term structured packing may refer to a range of specially designed materials for use in absorption and distillation columns and chemical reactors. Structured packings typically consist of thin corrugated material 24, such as metal plates or gauzes arranged in a way that they force fluids to take complicated paths through the column, thereby creating a large face area for contact between different phases. Structured packings may be made out of corrugated sheets arranged in a crisscrossing relationship to create flow channels for the vapour phase. The intersections of the corrugated sheets create mixing points for the liquid and vapour phases. Wall wipers are utilized to prevent liquid and/or vapour bypassing along the column wall. Rotating each structured packing layer about the column axis provides cross mixing and spreading of the vapour and liquid streams in all directions.

The opposed dominant faces 14 may be oriented vertical. The orientation of faces 14 may be determined relative to, for example, the ground. In other implementations, faces 14 may be oriented at an angle to the ground, e.g., slanted. The opposed dominant faces 14 may be oriented horizontal in some implementations. These implementation tends to have a larger footprint than the vertical slab implementation. The packing 12 may be formed as plural slabs 15. Plural slabs may also be, for example, by plural slabs arranged end-to-end, as opposed to the stacked orientation illustrated in FIG. 7C. In some implementations, the slab might be vertically sectionalized, effectively providing plural slabs end to end on top of one another. This may be required in order to get sufficiently good distribution of liquid in such a narrow aspect ratio (e.g., 20 m high by 1.5 m wide). Between the vertical sections there may be a collector/distributor system that collects fluid flowing from above and redistributes it evenly to the packing slab below. In some implementations, such a collector/distributor system may be present in any slab as disclosed herein.

The at least one liquid source 16 may further include at least one pump 26. Pump 26 may have several distribution pipes 28, controlled by a valve (not shown), in order to selectively apply liquid into various sections of packing 12. The at least one pump 26 may be configured to supply the carbon dioxide absorbent liquid in a series of pulses.

At least one fan 30 may be oriented to influence wind flow through at least a section of one of the opposed dominant faces 14 of the packing 12. Fan 30 may be reversible. In some implementations, fan 30 may prevent the wind flow that has already flowed through the packing 12 from circulating back into the packing 12. In some implementations, at least one fan 30 may drive the wind flow into packing 12. Referring to FIG. 7A, the fan 30 may further include plural fans, each of the fans being oriented to influence wind flow through at least a respective portion of the packing 12. In some implementations, the respective portion is understood as being the portion of the packing 12 that air flow through fan 30 would have the greatest influence over, for example the packing 12 most adjacent or closest to fan 30. The at least one fan 30 may be provided as part of a fan wall 32 adjacent at least one of the opposed dominant faces 14. It should be understood that fan walls (not shown) may be located adjacent each of faces 14. Adjacent, in this document, is understood to mean next to, and can include implementations (such as the one illustrated in the figures) where the fan wall 32 is spaced from, but adjacent to, face 14.

The fan wall 32 may be adjacent the one of the opposed dominant faces 14 through which the wind flow 18 is exiting the packing 12. In fan wall 32, the individual fans may be separated by impermeable material. The fans 30 create a pressure drop across the wall 32, which drives flow through the packing 12. In some implementations, fan wall 32 is designed such that, in the event that a fan fails, and ultimately blocks of its respective flow, flow through the packing 12 would be almost, if not completely, unaffected. This may be accomplished by closely spacing adjacent fans, and by spacing the fan wall 32 from the packing 12, for example.

Facility 10 may further include wind guides 34 oriented to direct the flow of wind 18 into the packing 12. Facility 10 may further include wind guides 36 oriented to direct the flow of wind 18 out of the packing 12. Wind guides 34 and 36 may be, for example, louvers. The wind guides 34 and 36 may be independently controllable. In this implementation, wind flow 18 is directed from the right to the left. Thus, the upper wind guides 34 are open, with the lower wind guides 34 closed. Similarly, upper wind guides 36 are closed, while lower wind guides 36 are open. Thus, wind flow 18 has a net flow from upper wind guides 24 to lower wind guides 36, passing through packing 12 in the process.

The facility 10 may be part of an at least partially enclosed structure 38. Because of the nature of the implementations disclosed herein, that being that they may involve the processing of great deals of wind, it may be important to shield facility 10 from the elements, including animals and insects. Wind guides 36 and 34 may aid in this, along with a surrounding structure adapted to selectively let in and process wind flow. In some implementations, a protective covering (not shown) may be provided over packing 12 to prevent animal intrusion but allow wind flow to pass through. A cleaning device 40 for cleaning the walls of the at least partially enclosed structure 38 may be provided. Cleaning device 40 may be, as illustrated for example, a wiper that rotates about an axis to clean the exterior of fan wall 32, for example. Wind guides 34 and 36 may be horizontally oriented, for example.

The facility 10 may further include at least one wind passage 42 extended through the opposed dominant faces 14 to deliver wind flow selectively to one of the opposed dominant faces 14. Wind passage 42 may have fan 30 attached to influence air flow through wind passage 42. Wind passage 42 allows wind to travel through faces 14, where it is released into basin 44, where the wind is free to pass into packing 12 through face 14A, exiting the packing 12 through face 14B. This way, wind flow may be induced to flow through the horizontal faces 14 of a horizontal slab of packing 12. Wind passages 42 may be, for example, air ducts that are 10 m in height. In the implementation illustrated, wind passages 42 are vertical ducts in which carbon dioxide rich inlet air is moving down. These ducts may cover about ⅕ of the surface area (e.g., about 1.2 m diameter tube arranged in a grid with 5 meter spacings).

A sink 46 may be provided for collecting carbon dioxide absorbent liquid or $CO_2$-lean solution stream that has flowed through the packing 12. The sink is illustrated as basin 44. Basin 44 may be, for example a concrete-lined basin that catches the hydroxide and contains supports to hold the packing. In some aspects, there may be a gap as illustrated between the packing 12 and the base 44 that can be about 1 to 1.5 m for example. In some implementations (not shown), sink 46 may be a pipe or a series of conduits for example, that transport the liquid directly from packing 12. This type of system may involve a funneling or drainage apparatus designed to focus the drainage of the liquid into a single, or a network of pipes. The contacted liquid may then be recirculated through the packing, or it may be recycled and then recirculated.

In some implementations, facility 10 further includes a recycling system for regenerating spent carbon dioxide absorbent liquid. The recycling system may be, for example, any system for recycling spent carbon dioxide liquid absorbent. For example, the carbon dioxide absorbent liquid may include a hydroxide solution, for example a sodium hydroxide solution. The source of liquid 16 preferably supplies recycled carbon dioxide absorbent liquid.

FIGS. 7A-7B illustrate a method of carbon dioxide capture. Carbon dioxide absorbing liquid is applied into packing 12 in a series of pulses. Referring to FIG. 7C, each pulse may involve, for example, a short period during which the liquid is supplied into packing 12 by source of liquid 16. Each pulse doesn't have to be a sharp transient application, but can be a period of time during which liquid is being supplied. A gas containing carbon dioxide, for example air illustrated by flow of wind 18, is flowed through the packing 12 to at least partially absorb the carbon dioxide from the gas into the carbon dioxide absorbing liquid. Applying may further include pumping. Flowing may further include flowing the gas containing carbon dioxide through the packing at least when the carbon dioxide absorbing liquid is not being applied. The flow of gas may be controlled using fans 30, for example. The flow of gas may be controlled using fans 30 and wind guides 34 and 36. The flowing of the gas may be at least restricted when the carbon dioxide absorbing liquid is being applied. This may be envisioned by the fans 30 of fan wall 32 ceasing to spin and draw the flow of wind through packing 12 when the pulse of liquid is being supplied to packing 12.

In some implementations, the series of pulses has a duty cycle of 1-50%. In other implementations, the duty cycle may be 5% for example. The duty cycle refers to the ratio of the time duration of a pulse of applied liquid to the overall time duration of a cycle. For example, a 50% duty cycle implies the fluid is only flowing half the time the facility is operational. This means the pulse runs from 1 to 50% of the time the system is operational, and therefore a 1% duty cycle means that for every second that fluid is flowing is off for 100 seconds. In more realistic values, it is on for 30 seconds and off for 3000 seconds and a 50% duty cycle means the pump would run for 30 seconds and be off for the next 30 seconds. In some implementations, the series of pulses has an off-time of 10-1000 seconds. In other implementations, the series of pulses has an off-time of 100-10000 seconds.

The step of applying may further include applying the carbon dioxide absorbing liquid into a first portion of the packing 12 in a first series of pulses, and applying the carbon dioxide absorbing liquid into a second portion of the packing 12 in a second series of pulses. This may be envisioned by selectively applying liquid via distribution tubes 28A and 28B to packing 12. Because tubes 28A and 28B only feed a portion (e.g., the left-most portion) of packing 12, only that portion will have liquid applied to it. Liquid may then be selectively applied to the right hand portion of packing 12 by applying liquid via tubes 28C and 28D. The first and second series of pulses may be synchronized, asynchronized, completely different, or synchronized out of phase with one another, for example, allowing fluids to be supplied intermittently from a continuously operating pump.

In these implementations, flowing the gas may further include at least restricting the flow of the gas containing carbon dioxide through the first portion of the packing when the carbon dioxide absorbing liquid is not being applied, and at least restricting the flow of the gas containing carbon dioxide through the second portion of the packing when the carbon dioxide absorbing liquid is not being applied. Thus, while the first portion has liquid being applied to it, for example the left hand portion of face 14 when liquid is being applied via tubes 28A and 28B, the flow of gas may be restricted or stopped altogether through the left hand portion of face 14. This may be accomplished by reducing, stopping, or even reversing fans 30A and 30B, for example. Similarly, while the second portion has liquid being applied to it, for example the right hand portion of face 14 when liquid is being applied via tubes 28C and 28D, the flow of gas may be restricted or stopped altogether through the right hand portion of face 14. This may be accomplished by reducing, stopping, or even reversing fans 30D and 30E, for example.

In some implementations, the first series of pulses and the second series of pulses are staggered. This may be advantageous, as when the left portion of face 14 has liquid being applied to it as described above, the right hand portion and center portions do not. Similarly, when the supply of liquid to the left hand portion is ceased, the source of liquid 16 may then apply liquid to the center or right hand portion, for example. This way, source of liquid 16 may cyclically feed liquid to the entire volume of packing 12 in a more efficient manner, instead of continuously feeding liquid to the entire volume of packing 12. In some aspects, an example of this may be further envisioned, with a horizontal slab of packing 12. In such aspects, the flow of wind through any of the various wind tubes 42 may be controlled, in order to achieve the same effect as that achieved above with the vertical slab implementation. Referring to FIG. 7B, an implementation is illustrated where only one wind tube 42A has wind being driven down it. This may be achieved by the selective actuation of fan 30A, for example. Thus, the packing 12 that is nearest the outlet of wind tube 42A may have a flow of gas fed to it.

In some implementations, the off-cycle of the series of pulses may be less than or equal to the time it takes for carbon dioxide absorbing liquid to stop draining from the packing after a pulse. It should be understood that this is not the time required for the entire pulse to be removed from the packing 12, since some liquid will always be left over as residue inside the packing 12. In other implementations, the off-cycle of the series of pulses may be less than or equal to the time it takes for a pulse of carbon dioxide absorbing liquid to lose 70-80% of the pulses carbon dioxide absorption capacity.

The packing may be oriented to flow the carbon dioxide absorbing liquid through the packing 12 in a mean liquid flow direction 20. Flowing may further include flowing the gas through the packing 12 obliquely or perpendicularly to the mean liquid flow direction 20. As disclosed above, this is advantageous as the flow of gas may have a different flow direction than, and one that is not counter current to, the mean liquid flow direction 20 of the liquid. Thus, a larger surface area of the packing may be used to full advantage, greatly increasing the quantity of wind or gas that may contact liquid in packing 12 over a course of time while still allowing the liquid to pass through and drain from packing 12. In these implementations, a slab is not entirely necessary, in fact other shapes of packing 12 are envisioned, including but not limited to a cube, a cylindrical, and other various shapes. Referring to FIG. 7A, in some implementations flowing the gas further includes flowing the gas through the packing 12 perpendicularly to the mean liquid flow direction 20. It should be understood that exact perpendicularity is not a requirement. Flowing may further include flowing the gas through at least one of the opposed dominant faces 14, for example through both of faces 14 as indicated.

These methods may involve recycling the carbon dioxide absorbing liquid. Also, the methods may involve influencing the flowing of the gas through the packing Influencing may include, for example, preventing the gas that has already flowed through the packing 12 from circulating back into the packing 12. Influencing may further include driving the flowing of the gas in a drive direction that is at least partially oriented with an ambient wind flow direction. This may be carried out using fans 30, which may be reversible in order to carry out this function. Further, these methods may involve directing the flow of gas at least one of into and out of the packing, using, for example louvers as already disclosed.

In some implementations, fans 30 may be reversible in order to enable the flow to be driven in the direction of the ambient wind field, which is more efficient than inducing a flow that is counter to the prevailing wind direction. In some aspects, the orientation of slabs 15 may be such that prevailing wind 18 is perpendicular to the slab 15, and is in the direction at which the fan wall (not shown) works most efficiently. The packing design may use vertically oriented plates. This would be a modification of conventional structured packing designed to enable, for example, orthogonal liquid and gas flow directions. Packing may be for intermittent fluid flow so as to maximize the hold up of liquid absorbent inside the packing material. Referring to FIG. 7A, as disclosed above, the fan wall 32 may be sectionalized, so that flow speed can be reduced or stopped when fluid is flowing to minimize fluid loss. The sections may be operated asynchronously so that only one section at a time is receiving the fluid flow enabling fluid pumps to operate continuously. For example, if fluid flow was needed for 100 seconds out of 1000 one may have 11 sections and would direct the fluid into one of them at a time.

Compared to the horizontal slab geometry, the vertical slab may: minimize the footprint and the total structure size per unit of capacity to reduce the capital cost, reduce peak velocity, improve efficiency, and enables the packing to be operated at higher peak velocities further reducing capital costs.

Some implementations may invoke the use of louvers to enable the flow to be driven in the direction of the ambient wind without altering the operation of the fans. For instance, the packing design may using coaxial flow or counter current flow, while still benefiting from the larger surface area of the slab to increase the amount of wind flow through the slab. The flow geometry allows one to get even flow though a large horizontal slab mounted just above a fluid reservoir while maintaining air speeds below about 5 msec. The air speed constraint determines the ratio of the structures height to its width. Specifically, height/width is approximately equal to airspeed-at-packing/air-speed-at-exit. Compared to the vertical slab geometry, the horizontal slab has a larger footprint, and may have higher costs, but it has the advantage that it may use more conventional packing and fluid distribution.

FIG. 7A-7C also illustrate another method of carbon dioxide capture. Carbon dioxide absorbing liquid or $CO_2$-lean solution stream is flowed through packing 12 in a mean liquid flow direction 20, a gas containing carbon dioxide is flowed through the packing 12 obliquely or perpendicularly to the mean liquid flow direction 20 to at least partially absorb the carbon dioxide from the gas into the carbon dioxide absorbing liquid. Flowing carbon dioxide absorbing liquid through packing 12 may further include applying the carbon dioxide absorbing liquid into the packing 12 in a series of pulses. The series of pulses has been disclosed in detail throughout this document, and need not be built upon here. As disclosed above, flowing the gas further may include flowing the gas through the packing 12 perpendicularly to the mean liquid flow direction 20.

FIGS. 7A-7C also illustrate a method of contacting a liquid with a gas, including applying the liquid into packing 12 in a series of pulses and flowing the gas through the packing 12. While this method is also envisioned for some of the implementations herein, it may not be as efficient as the pulsed method, as it requires far greater pumping action. Thus, the pulsed method may be applied to any gas-liquid absorber, because it has been proven herein to afford sufficient gas-liquid contact despite a lack of continuous pumping. An exemplary application of this may be provided as a scrubbing unit at a refinery, for example. It should be understood that the gas-liquid absorber may have all of the same characteristics as the carbon dioxide capture facility as disclosed herein.

FIGS. 7A-7C also illustrate a method of contacting a liquid with a gas including flowing the liquid through packing in a mean liquid flow direction, and flowing the gas through the packing obliquely or perpendicularly to the mean liquid flow direction. Similar to the gas-liquid absorber or contactor, this method may be applied to any gas-liquid contact system. By having the gas flowed through the packing at an angle, the structure of such an absorber employing this method would be greatly simplified, since the gas inlet and outlet will be at different locations in the packing then the liquid source and sink. This method may have most or all of the same characteristics as the carbon dioxide capture methods disclosed herein. For example, flowing the liquid through the packing may further include applying the liquid into the packing in a series of pulses. Furthermore, flowing the gas may further include flowing the gas through the packing perpendicularly to the mean liquid flow direction.

Referring to FIG. 7A, a gas-liquid absorber (illustrated by absorber facility 10) includes packing 12 formed as a slab 15, the slab 15 having opposed dominant faces 14, the opposed dominant faces 14 being at least partially wind penetrable to allow wind to flow through the packing 12. At least one liquid source 16 is oriented to direct the liquid into the packing 12 to flow through the slab 15. The slab is disposed in a wind flow 18 that has a non-zero incident angle with one of the opposed dominant faces 14. It should be understood that this gas-liquid absorber may have all of the same characteristics as the carbon dioxide capture facility and absorber disclosed herein.

Referring to FIG. 7A, a gas-liquid absorber (illustrated by facility 10) includes a slab 15 structure including packing 12 and a liquid source 16 oriented to direct the liquid into the packing 12 to flow in a mean liquid flow direction 20. The slab structure is disposed in a wind flow 18 that flows obliquely or perpendicularly to the mean liquid flow direction 20. It should be understood that this gas-liquid absorber may have all of the same characteristics as the carbon dioxide capture facility and absorber disclosed herein.

A method of contacting a liquid with a moving gas (illustrated as wind flow 18) is also illustrated in FIGS. 7A-7C. The method includes flowing the liquid through packing 12, and driving the moving gas through the packing 12 in a drive direction (illustrated as 18B, which is the same as wind direction 18 in this implementation) that is at least partially oriented with an ambient flow direction 18 of the moving gas. In the implementation shown, the flowing gas is wind, and the ambient flow direction is the ambient wind direction 18. This method may further include reversing the drive direction 18B when the ambient flow direction 18 reverses. Reversing the fan direction (or more generally, reversing the forced flow of air through the packing) in such a way as to drive the air with a vector direction that is at least partially oriented with the ambient wind 18 reduces the required fan power. Further, this reduces the amount of low-carbon dioxide air that is recycled back into the inlet of the system, thus improving its efficiency. It is thus advantageous to align the packing such that one of opposed dominant face 14 is roughly perpendicular to the prevailing wind, in order to maximize the efficiency of the fans.

Turning back to FIG. 5, where a process for growing and processing calcium carbonate crystal aggregates to convert a portion of carbonate content in a liquid stream in an air-capture plant to hydroxide, in association with an air-fired calciner, $CO_2$ capture, and a gas absorber is illustrated. In some aspects, the slaking unit 110 as employed in this embodiment operates in the same or similar manner, using the same or similar input material streams and outputting the same or similar materials as shown in FIG. 1 and described in the first embodiment.

Once the calcium hydroxide slurry (stream 111) is produced it is transferred to unit 120 which grows calcium carbonate aggregates by reacting the calcium hydroxide slurry with the $CO_2$-rich stream 411 discharged from the air or gas absorber unit 510. The calcium hydroxide reacts with a portion of the dissolved carbonate content of stream 411 in a controlled manner via reaction (2). This reaction is carried out in a fluidized bed reactive crystallizer (trade name: Crystalactor® or pellet reactor) which has been optimized to operate in a high pH environment. The calcium hydroxide slurry of stream 111 is metered into this device to control the rate at which calcium carbonate is formed and the device is arranged such that the reaction to form the calcium carbonate occurs in close proximity to growing calcium carbonate crystal aggregates. As a result of controlling the rate of reaction (2) and the environment as reaction (2) occurs calcium carbonate crystal aggregates with average volumes equivalent to spheres with diameters between 0.1 mm to 2 mm are produced. The liquid from this equipment has had a portion of the carbonate converted to hydroxide and it is discharged back to the air or gas absorber unit 510 as the $CO_2$-lean stream 421 while the solid calcium carbonate crystal aggregates which have grown to the desired size are removed from the fluidized bed reactive crystallizer as a mixture of solution and calcium carbonate crystal aggregates and sent onward to the next processing step as stream 121.

Due to the size, morphology, and physical properties of the calcium carbonate crystal aggregates in stream 121 they can be almost completely separated from the solution in stream 121, such that the accompanying solution after separation is less than about 15% of the total weight of the calcium carbonate crystal aggregates, in unit 130 using industrial separation equipment such as screens or spiral classifiers. The calcium carbonate crystal aggregates are then washed with stream 103 which includes clean water and removes a majority of any residual solution on the calcium carbonate crystal aggregate surface. Both the spent caustic wash water and the undiluted hydroxide solution are mixed and sent back to the gas absorber unit 510 as the $CO_2$-lean stream 431. The solution and water removed in this processing step can both be delivered back to the gas absorber unit 510 or recycled back to the fluidized bed reactive crystallizer unit 120. The calcium carbonate crystal aggregates which have now been washed and separated from the hydroxide solution are sent as stream 132 to a drying unit 140 which vaporizes any residual moisture.

In some aspects, units 140 and 150 as employed in this embodiment operate in the same or similar manner, using the same or similar input material streams, and outputting the same or similar materials as shown in FIG. 1 and described in the first embodiment. Except in this embodiment, stream 152 of hot gases leaving the calcination unit 150 are used to dry and preheat stream 132

FIG. 6 illustrates an example process 600 for growing and processing calcium carbonate crystal aggregates to convert a portion of carbonate content in a liquid stream to hydroxide as applied in an air-capture plant, with an Air Separation Unit (ASU), an oxy-fired calciner, a boiler, and $CO_2$ capture. The example process 600, as shown, includes an ASU 310 in material communication with the dryer 140 and the calciner 150. The example process 600 also includes the gas absorber 510, the unit 110 (e.g., slaker), the fluidized bed reactive crystallizer 120, the separation and washing unit 130, a calciner 150 (e.g., an oxy-fired calciner), and a boiler 320.

In the illustrated process 600, the illustrated gas absorber unit 510 absorbs $CO_2$ from atmospheric air using a combination of $CO_2$-lean solution stream 421 from the fluidized bed reactive crystallizer 120 and dilute $CO_2$-lean stream 431 from separation and washing unit 130. After the absorption of $CO_2$, the gas absorber returns the resulting $CO_2$-rich stream 411 to unit 120. Therefore, in some aspects, the process provides at least $CO_2$-lean solution to the gas absorber, and in-turn receives the $CO_2$ rich liquor from the gas absorber.

The slaking unit 110 as employed in this embodiment operates in the same or similar manner, using the same or similar input material streams and outputting the same or similar materials as shown in FIG. 1 and described in the first embodiment.

Units 120 and 130 as employed in this embodiment operate in the same or similar manner, using the same or similar input material streams, and outputting the same or similar materials as shown in FIG. 5 and described in the sixth embodiment.

The drying unit 140, calciner 150 and auxiliary boiler 320 as employed in this embodiment operate in the same or similar manner, using the same or similar input material streams and outputting the same or similar materials as shown in FIG. 3B and described therein. In this embodiment the resulting $CO_2$ rich flue gases 321 could be sent for further processing, purification and compression of $CO_2$ using commercially available technology.

A number of implementations have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Further, in some implementations, one or more method or processes disclosed here, such as, for example, processes 100, 200, 300, 350, 400, 500, and 600 may be performed with additional steps, fewer steps, or may be performed in different orders than those disclosed herein, within the scope of the present disclosure. As another example, although a control system (e.g., control system 108) is not illustrated as part of processes 200, 300, 350, 400, 500, and 600, each of the aforementioned processes may include a control system (e.g., control system 108) communicably coupled to the illustrated components and configured to perform operations and/or execute instructions to implement such processes (and other processes). Accordingly, other implementations are within the scope of the following claims.

What is claimed is:

1. A method for converting a portion of a carbonate to hydroxide, the method comprising:
   receiving an alkaline carbonate solution that comprises between 0.1M (moles per liter of solution) to 4.0M hydroxide and between 0.1M to 4.1M carbonate;
   reacting, in a slaking process, quicklime (CaO) and a low carbonate content fluid to yield a slurry of primarily slaked lime ($Ca(OH)_2$);
   reacting, via a causticization reaction, the $Ca(OH)_2$ slurry and the alkaline carbonate solution to produce hydroxide and grow calcium carbonate ($CaCO_3$) crystal aggregates of 0.0005 mm³ to 5 mm³ in volume in a fluidized-bed reactive crystallizer;
   conditioning the $CaCO_3$ crystal aggregates; and
   calcining the conditioned $CaCO_3$ crystal aggregates to yield CaO and carbon dioxide ($CO_2$).

2. The method of claim 1, wherein calcining the conditioned $CaCO_3$ crystal aggregates comprises calcining the conditioned $CaCO_3$ crystal aggregates at a gauge pressure from between 100 Pa and 1000 kPa.

3. The method of claim 1, wherein conditioning the $CaCO_3$ crystal aggregates comprises:
   washing the $CaCO_3$ crystal aggregates; and
   drying the washed $CaCO_3$ crystal aggregates.

4. The method of claim 3, further comprising, partially removing, through the washing, compounds containing one or more of alkali metals, sulphur, silicon, iron, copper, magnesium, boron, chromium, antimony, cadmium, molybdenum, vanadium, zinc or phosphorous.

5. The method of claim 4, wherein calcining the conditioned $CaCO_3$ crystal aggregates comprises calcining the $CaCO_3$ crystal aggregates in equipment that are sensitive to compounds containing one or more of alkali metals, sulphur, copper, magnesium, boron, chromium, antimony, cadmium, molybdenum, vanadium, zinc, phosphorous, iron, or silicon.

6. The method of claim 3, wherein drying the washed $CaCO_3$ crystal aggregates comprises:
capturing heat from a heat source; and
supplying the captured heat to dry the washed $CaCO_3$ crystal aggregates at a temperature between 20° C. and 500° C.

7. The method of claim 3, wherein washing the $CaCO_3$ crystal aggregates comprises recycling the spent wash water for use as a low carbonate content fluid to the slaking process.

8. The method of claim 1, wherein calcining the conditioned $CaCO_3$ crystal aggregates to yield CaO and $CO_2$ comprises calcining the conditioned $CaCO_3$ crystal aggregates to yield CaO, $CO_2$, and heat in a solid product or off-gas, the method further comprising:
producing electricity from the heat; using the heat to raise the temperature of material before it enters the calciner; using the heat to dry $CaCO_3$ crystal aggregates; and delivering the heat to other equipment employed in this method or other industrial processes.

9. The method of claim 1, wherein the low carbonate content fluid comprises water, and
an amount of carbonate in the water comprises less than 0.1 moles of carbonate for every 1 mole of CaO delivered to the slaking process.

10. The method of claim 1, further comprising:
supplying heat to the calcination by combusting a hydrocarbon with oxygen in a first stream from an air separation unit (ASU) that comprises less than 10 mole % nitrogen; and
producing a second stream which is depleted in oxygen with respect to air and contains less than 0.1 mole % water vapour from the ASU.

11. The method of claim 10, wherein conditioning the washed $CaCO_3$ crystal aggregates comprises drying the washed $CaCO_3$ crystal aggregates with the second stream from the ASU.

12. The method of claim 10, further comprising:
mixing a second amount of oxygen supplied by the ASU with gases from the calcination of the conditioned $CaCO_3$ crystal aggregates; and
combusting the mixture of oxygen and gases in a boiler to produce steam and supplying the steam to the dryer, another industrial process, or a steam turbine to produce electrical power.

13. The method of claim 1, wherein the alkaline carbonate solution comprises a green liquor from a pulping plant, the method further comprising:
providing an alkaline solution formed from reacting the $Ca(OH)_2$ slurry and the alkaline carbonate solution to the pulping plant as clarified white liquor.

14. The method of claim 1, further comprising:
feeding the captured $CO_2$ to a process that uses the captured CO2 to precipitate a portion of a component of a black liquor in a pulping plant; and
producing, from the process, a by-product.

15. The method of claim 1, further comprising:
capturing a basic solution formed from reacting the $Ca(OH)_2$ slurry and the alkaline carbonate solution;
providing the captured basic solution to a gas absorber that captures atmospheric $CO_2$; and
receiving, from the gas absorber, the alkaline carbonate solution.

16. The method of claim 1, further comprising:
capturing a basic solution formed from reacting the $Ca(OH)_2$ slurry and the alkaline carbonate solution;
providing the captured basic solution to a gas absorber that captures $CO_2$ from an industrial process; and
receiving, from the gas absorber, the alkaline carbonate solution.

17. The method of claim 1, wherein the low carbonate content fluid comprises at least one of steam or liquid water.

18. The method of claim 1, wherein reacting, in a slaking process, CaO and a low carbonate content fluid comprises reacting, in a slaking process, CaO and a low carbonate content liquid at a condition that comprises a temperature between 100° C. and 200° C. and a pressure such that the equilibrium state of water is liquid.

19. The method of claim 1, further comprising:
capturing heat produced from the slaking process; and
using the heat to perform at least one of: generating steam, transferring the heat to a process stream, or generating power.

20. The method of claim 1, further comprising:
processing at least a portion of the produced $CaCO_3$ crystal aggregates to produce a seed material; and
growing new $CaCO_3$ crystal aggregates on the seed material.

* * * * *